(12) United States Patent
Tudor et al.

(10) Patent No.: US 11,186,047 B2
(45) Date of Patent: Nov. 30, 2021

(54) TUBULAR COMPOSITE STRUCTURES AND METHODS OF MOLDING SUCH STRUCTURES

(71) Applicant: DOW GLOBAL TECHNOLOGIES, LLC, Midland, MI (US)

(72) Inventors: Jay M. Tudor, Goodrich, MI (US); David H. Bank, Midland, MI (US); Jeffery D. Zawisza, Midland, MI (US); Peter J. Schulz, Midland, MI (US); Liangkai Ma, Midland, MI (US); Mark Pijaszek, Bay City, MI (US); Mark Mirgon, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 16/961,391

(22) PCT Filed: Mar. 1, 2019

(86) PCT No.: PCT/US2019/020229
§ 371 (c)(1),
(2) Date: Jul. 10, 2020

(87) PCT Pub. No.: WO2019/169237
PCT Pub. Date: Sep. 6, 2019

(65) Prior Publication Data
US 2020/0391449 A1 Dec. 17, 2020

Related U.S. Application Data

(60) Provisional application No. 62/637,627, filed on Mar. 2, 2018.

(51) Int. Cl.
*B29C 70/34* (2006.01)
*B29C 70/46* (2006.01)
(Continued)

(52) U.S. Cl.
CPC ............ *B29C 70/34* (2013.01); *B29C 70/462* (2013.01); *B29K 2063/00* (2013.01); *B29K 2307/04* (2013.01); *B29L 2023/00* (2013.01)

(58) Field of Classification Search
None
See application file for complete search history.

(56) References Cited

U.S. PATENT DOCUMENTS

| 3,307,738 A | 3/1967 | Scheindel |
| 3,330,550 A * | 7/1967 | Brownlee ................. B64F 5/10 269/22 |

(Continued)

FOREIGN PATENT DOCUMENTS

| BE | 664281 | 9/1965 |
| DE | 3238651 | 4/1984 |

(Continued)

OTHER PUBLICATIONS

Agilent Technologies, "The Fundamentals of Modal Testing", p. 22-24.

(Continued)

*Primary Examiner* — Jeffry H Aftergut

(57) ABSTRACT

The disclosure provides for a method including: a) forming a layered tubular member (12) by placing one or more outer layers (16) about an inner layer (14) and joining at one or more seams (56) along a length of the layered tubular member, wherein the one or more outer layers include a first resin impregnated therein; b) applying the first resin or a second resin at the one or more seams; c) creating one or more fillets (58) along the one or more seams with the first resin, the second resin, or an adhesive; and d) curing the first resin, the second resin, and the adhesive so that the layered tubular member, the first resin, the second resin, and the adhesive form a composite structure having a tubular shape.

20 Claims, 7 Drawing Sheets

(51) Int. Cl.
     *B29K 63/00*          (2006.01)
     *B29K 307/04*        (2006.01)
     *B29L 23/00*          (2006.01)

(56) References Cited

U.S. PATENT DOCUMENTS

| | | |
|---|---|---|
| 4,808,362 A | 2/1989 | Freeman |
| 5,534,203 A | 7/1996 | Nelson et al. |
| 8,689,670 B2 | 4/2014 | Levesque |
| 2003/0075256 A1* | 4/2003 | Ondrus ............... C09J 5/00 156/60 |

FOREIGN PATENT DOCUMENTS

| | | |
|---|---|---|
| DE | 102009014985 | 6/2015 |
| EP | 2899009 | 7/2015 |
| WO | 199607533 | 3/1996 |
| WO | WO-2008/119491 A2 * | 10/2008 |
| WO | WO-2010/015246 A1 * | 2/2010 |
| WO | 2010111700 | 9/2010 |
| ZA | 2010004461 B | 9/2012 |

OTHER PUBLICATIONS

Lehmann, "Cores Lead to an Automated Production of Hollow Composite Parts In Resin Transfer Moulding", 1998, p. 803-810.

* cited by examiner

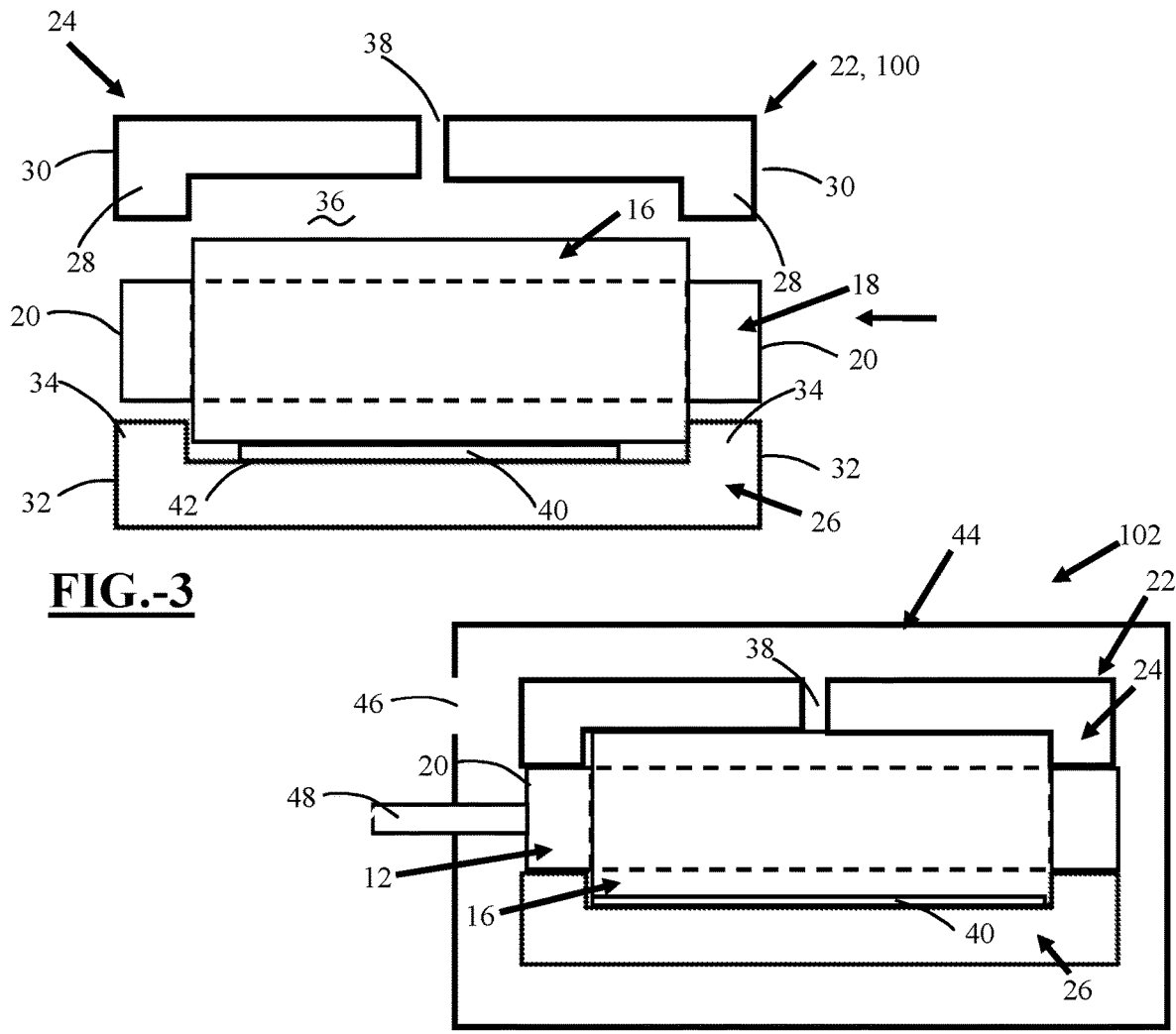
FIG.-3
FIG.-4
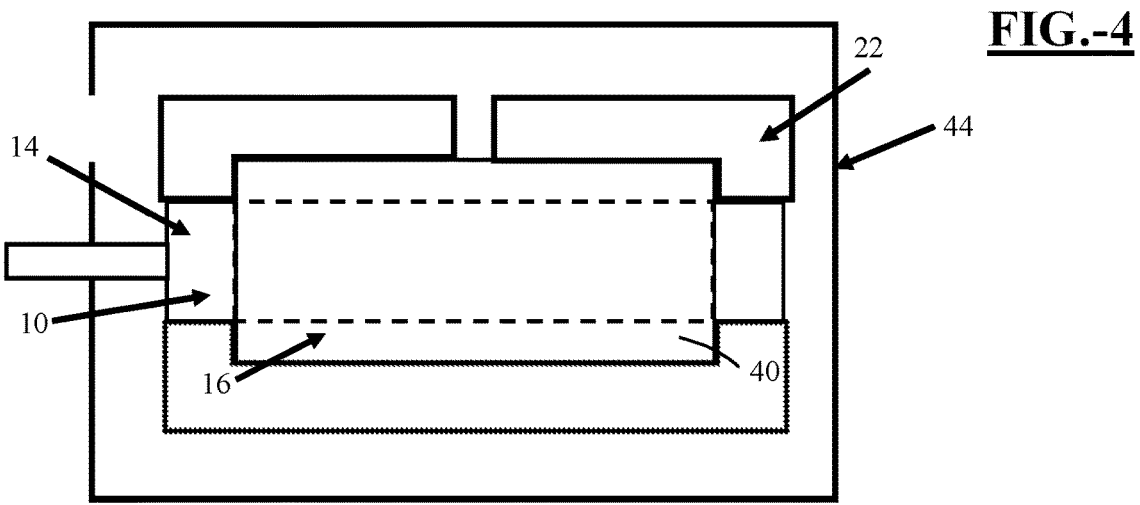
FIG.-5

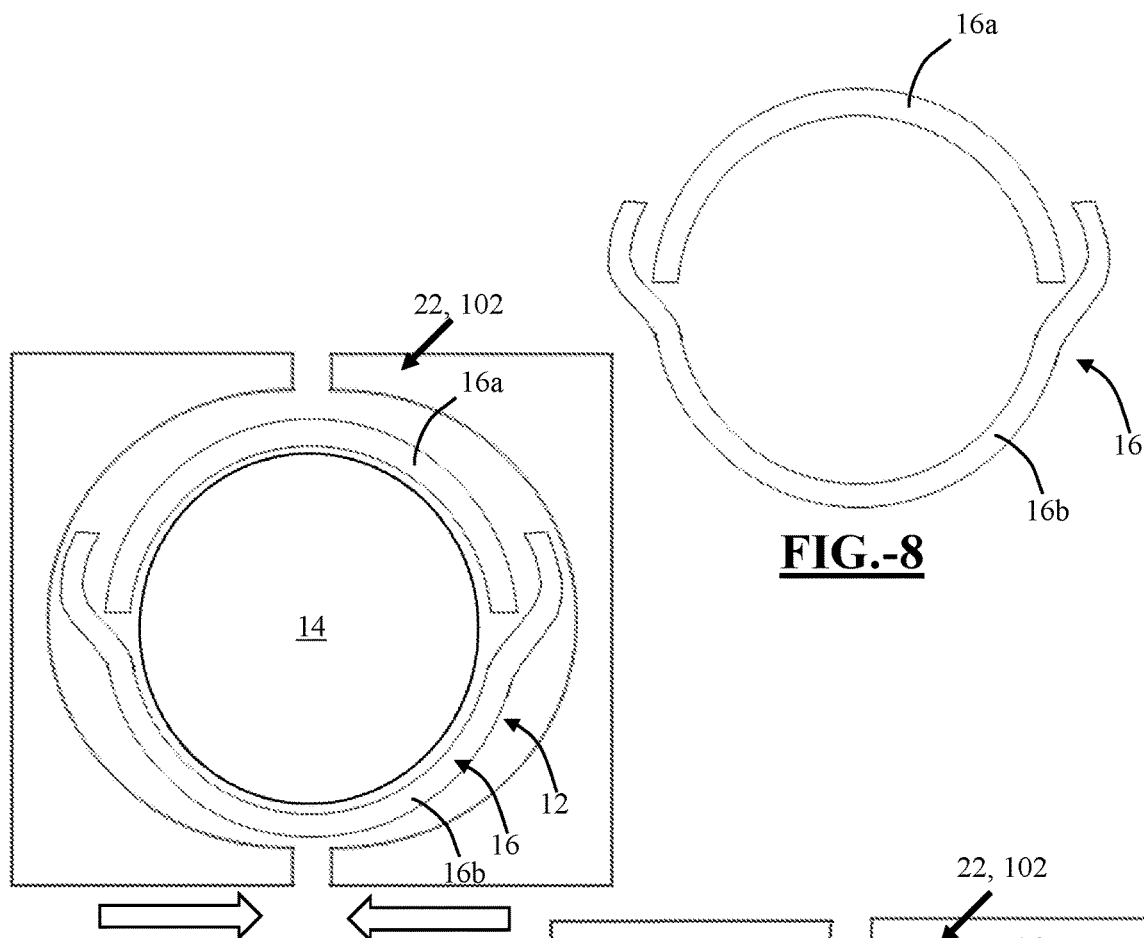
FIG.-8
FIG.-9A
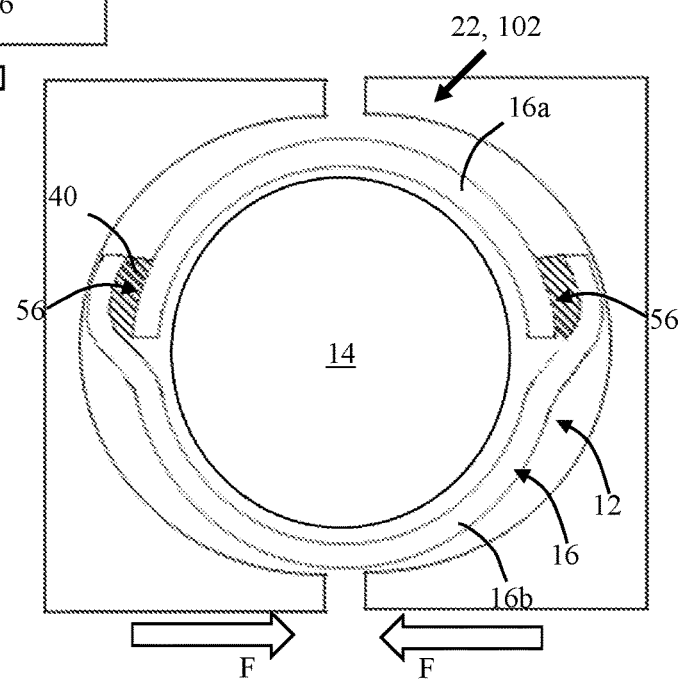
FIG. 9B

Applied Frequency (Hz)

Applied Frequency (Hz)

TUBULAR COMPOSITE STRUCTURES AND METHODS OF MOLDING SUCH STRUCTURES

FIELD

The present teachings relate to composite structures and methods of molding such structures. The present teachings may be particularly useful in forming tubular composite structures, including composites comprising carbon fiber.

BACKGROUND

Metal tubular components are used in a variety of fields to provide structural reinforcement. These metal tubular components have been manufactured via stamping and then welding two separate part halves, and also via hydroforming to provide seamless components. Generally, hydroforming metal into a tubular component requires inserting a metal tube into a series of presses (e.g., tube bender, pre-form press, hydroforming press, etc.) and assembly stations (e.g., parts wash, cutting, etc.) to bend, pre-form, and then shape the tube into a final shape.

The need for component weight reduction in the automotive, aerospace, and sports industries has resulted in the need for forming lighter weight components having the same strength and stiffness as traditional metal components. Carbon fiber composites have been found as having characteristics suitable for use as structural reinforcements by providing low part weights exhibiting high strengths. WO 2010/111700 discloses an elegant solution for forming carbon fiber composite tubing in order to achieve the weight saving potential and complex tubular shapes provided by carbon fiber composites. Notwithstanding, there are still challenges faced with forming tubular composite structures to achieve an even application of a resin to a tubular component prior to curing, and forming complex shaped tubular components. Additionally, there remains a need for application of a resin and curing of a composite structure within a short cycle time to allow for automated, mass production and commercialization.

There remains a need for a streamlined process for forming tubular components which reduces complexity in press and assembly stations while providing for a process which forms complex shapes and contours in the tubular component. There remains a need to efficiently and evenly distribute a resin to allow for curing of a tubular composite structure within a short cycle time which still yields a tubular composite structure exhibiting high strength and stiffness.

SUMMARY

The present disclosure relates to a method comprising: a) forming a layered tubular member by inserting an at least partially hollow inner layer into a porous outer layer, wherein the porous outer layer is fitted about at least a portion of an outer surface of the inner layer; b) inserting the layered tubular member into a mold which is enclosed by a vacuum chamber; c) impregnating the porous outer layer with a resin by having the vacuum chamber pull a vacuum on the mold; and curing the resin so that the layered tubular member and resin form a composite structure having a tubular shape.

The present disclosure relates to a method comprising: a) forming a layered tubular member by placing one or more outer layers about an inner layer and joining at one or more seams along a length of the layered tubular member, wherein the one or more outer layers include a first resin impregnated therein; b) applying the first resin or a second resin at the one or more seams; c) creating one or more fillets along the one or more seams with the first resin, the second resin, or an adhesive; d) curing the first resin, the second resin, and the adhesive so that the layered tubular member, the first resin, the second resin, and the adhesive form a composite structure having a tubular shape.

The method of the disclosure may include one or more of the following features in any combination: pressure may be supplied to an inside of the layered tubular member while a vacuum is pulled on the mold; the inner layer may remain or may be removed from the composite structure after the resin is cured; the inner layer may comprise an elastomeric material to allow for expansion of an inner layer under pressure; the outer layer may be woven, nonwoven, or both; the outer layer may be a braided material; the outer layer may include an interior material; the outer layer may be shaped as a sleeve; the outer layer may be seamless; the resin may be a thermoset resin system; the resin may be an epoxy system; the inner layer may be a film; the resin may be applied by wet compression, high pressure resin transfer molding, pre-impregnation into the outer layer, or any combination thereof; the resin may be applied to an outside of the inner layer, outside of the outer layer, inside of the outer layer, or a combination thereof; the inner layer may include a bladder member; a bladder member may be at least partially hollow; one or more caps may be applied to one or more ends of a bladder member; one or more caps may seal an inner layer from an external pressure; a mold may seal about one or more caps in a closed position of the mold; a stiffness member may be inserted into an inner layer; an inner layer may include a stiffness member; a stiffness member may extend from one end of a bladder member to an opposing end of the bladder member; a mold may include a hollow chamber which may receive a layered tubular member; a mold may include at least one opening through which a hollow chamber may be in communication with a vacuum chamber; a resin may be dispensed onto a last a portion of a hollow chamber of a mold; a resin may be applied to a surface of a hollow chamber prior to inserting the layered tubular member in the hollow chamber; a first resin, second resin, and/or adhesive may be the same or different from one another; adhesive of one or more fillets may be squeeze-out of a second resin, applied separate to one or more outer layers at a seam, or both; a second resin within one or more seams may be squeeze out of a first resin, applied separately between surfaces of one or more outer layers, or both; an adhesive may be applied to one or more edges of one or more outer layers to create one or more fillets; one or more edges may include one or more inner edges, outer edges, or both; one or more fillets may have one or more profile shapes; one or more profile shapes may include convex, concave, linear, freeform, or a combination thereof; a second resin may be applied to one or more seams within a mold, outside of a mold, or both; curing a first resin, a second resin, and an adhesive may occur simultaneously, separately, or a combination thereof; the inner layer may be a mandrel; one or more seams may include two or more seams; one or more fillets may include one or more interior fillets, exterior fillets, or both; pulling a vacuum may be so that a pressure within a chamber may be about 0.0 psi or greater to about 5 psi or less; curing the resin, first resin, second resin, or any combination thereof may be at a temperature of about 18° C. or greater to about 200° C. or less; a cycle time for curing the layered tubular into the composite structure may be 0.1 minutes or greater to about 15 minutes or less; a cycle time for curing the layered tubular into the composite structure may be 0.1 minutes or greater to about 3 minutes or less; or any combination thereof. The composite structure and method of forming the composite structure of the teachings herein may provide a reinforcement structure. The reinforcement structure may be useful in transportation vehicles, sporting equipment, and the like. The teachings herein may provide a carbon composite structure able to be and/or formed in complex tubular shapes. The complex tubular shapes may have one or more contours along a length to allow for differing cross-sectional shapes in a tubular composite structure. The tubular composite structure may be seamless or include one or more seams. The composite structure and method herein may utilize a fast curing resin composition in combination with woven and/or nonwoven fibers to provide a composite structure with exceptional strength and stiffness while having a low part weight. The teachings herein may provide for tubular composite members which may be completely hollow by removing an inner layer from a cured layered tubular member to result in a hollow composite structure having a low part weight. The composite structure may have a volumetric mass density of about 1.3 $g/cm^3$ to about 2.5 $g/cm^3$. The composite structure formed by the methods disclosed herein may have a compressive strength of about 150 MPa to about 2000 MPa, a tensile strength of about 300 MPa to about 3000 MPa, or both. The disclosure may provide for an outer layer and/or inner layer which may be seamless to avoid weaker regions in the composite structure. The disclosure may provide for an outer layer having one or more seams to expedite the cycle time to produce a composite structure. The one or more seams may be reinforced by one or more fillets to avoid weaker regions in the composite structure. A vacuum may be used to uniformly distribute and impregnate a resin into the outer layer of the composite structure, expedite the curing time of a resin to produce a composite structure within a relatively short cycle time, or both. The cycle time may range from about 0.1 minutes to about 10 minutes, or even from about 0.1 minutes to about 5 minutes.

BRIEF DESCRIPTION OF DRAWINGS

FIG. 3 illustrates a layered tubular member located within the mold.

FIG. 4 illustrates a mold in a closed position.

FIG. 5 illustrates a composite structure within the mold and vacuum chamber.

FIG. 8 illustrates a cross-section of outer layers.

FIG. 9A illustrates a mold enclosed about a layered tubular member.

FIG. 9B illustrates a mold enclosed about a layered tubular member.

DETAILED DESCRIPTION

Figure 1A:
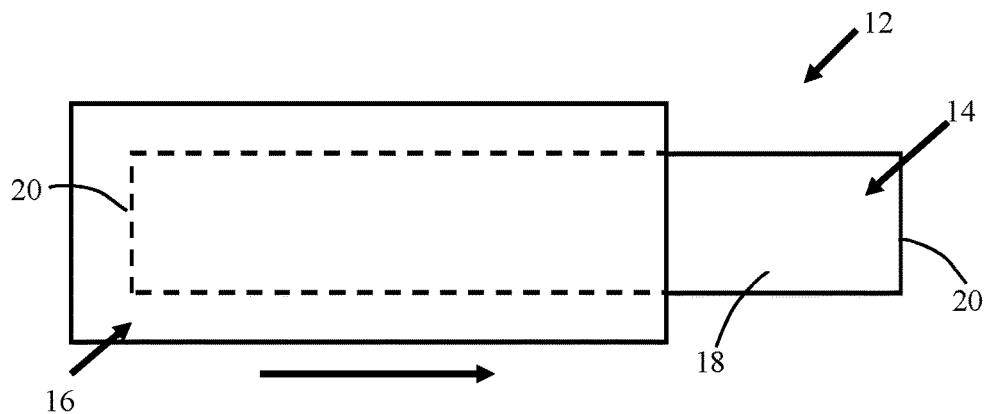
FIG. 1A illustrates a plan view of an inner layer being inserted into an outer layer.

The disclosure relates to a composite structure and methods of making the composite structure. The composite structure may be particularly useful after being formed into a tubular composite structure. The composite structure may be useful as a reinforcement structure, handling structure, and the like. The composite structure may be particularly useful in weight sensitive applications. The composite structure may be useful in forming and/or reinforcing bodies of transportation vehicles suitable for land, air, or water. Land vehicles may include cars, buses, trucks, trains, trams, motorcycles, bicycles, skateboards, scooters, and the like. Air vehicles may include airplanes, helicopters, spacecraft, gliders, blimps, hot air balloons, and the like. Water vehicles may include ships, sailboats, ferries, speed boats, and the like. For example, the tubular composite structure may form part of a car frame. As a further example, the tubular composite structure may form part or all of a bicycle frame. The composite structures may also be used in non-vehicular applications, such as in the sports industry. The composite structure may find use in providing a handling structure in sporting equipment. A handling structure may include a handle portion or an entire length of a piece of sporting equipment. Sporting equipment may include golf clubs, baseball and/or softball bats, rackets (e.g., tennis, squash), mallets, cue sticks, and the like. The composite structures may be particularly useful in providing stiffness and strength typically found in tubular steel structural components. The teachings herein may utilize fast curing resin compositions in combination with woven fibers, non-woven fibers, or both to form a composite structure with exceptional strength and stiffness while having a low part weight. Furthermore, the teachings herein may utilize a vacuum to expedite the curing time of a resin to produce composite structures within a relatively short cycle time.

The composite structure may have any shape suitable for a target application, such as providing reinforcement. The present teachings may be particularly advantageous in forming tubular composite structures, such as those having more complex shapes and contours. A cross-section of the tubular shape taken generally perpendicular to its longitudinal axis may be circular, square, rectangular, ovular, elliptical, triangular, polygonal, the like, or any combination thereof. The tubular shape may be straight or have one or more contours along part of a length. One or more contours may include one or more bends, differing widths, or both in a tubular shape. One or more contours may provide a tubular shape having differing cross-sectional shapes along a length. For example, a portion of the composite structure may have a circular cross-section which extends into an elliptical cross-section. One or more contours may provide a tubular shape having one or more arcuate bends. The contours may provide for a curved tubular shape resembling a shape similar to a C, N, S, V, W, the like, or any combination thereof. The composite structure may be hollow, partially filled, or solid. A hollow composite structure may provide an even lighter weight structure having exceptional strength and stiffness. The composite structure may be formed by a layered tubular member which is shaped and cured within a mold.

The composite structure may exhibit a strength and stiffness suitable to function as a reinforcement structure. The composite structure may have a tensile strength of about 300 MPa or greater, about 500 MPa or greater, about 700 MPa or greater, or even about 800 MPa or greater. The composite structure may have a tensile strength of about 3,000 MPa or less, about 2,500 MPa or less, about 2,000 MPa or less, or even about 1,700 MPa or less. Tensile strength may be measured according to the test method in ASTM D3039. The composite structure may have a compressive strength of about 150 MPa or greater, about 200 MPa or greater, even about 250 MPa or greater. The composite structure may have a composite strength of about 2000 MPa or less, about 1500 MPa or less, or even about 1250 MPa or less. Compressive strength may be measured according to the test method in ASTM D6641. The composite structure may have a density while exhibiting strength and stiffness to suitably function as a reinforcement structure while providing a low-weight structure. The composite structure may have a density (e.g., volumetric mass density) of about 1.3 $g/cm^3$ or greater, about 1.4 $g/cm^3$ or greater, about 1.5 $g/cm^3$ or greater. The composite structure may have a density of about 2.5 $g/cm^3$ or less, about 2.1 $g/cm^3$ or less, about 1.8 $g/cm^3$ or less, about 1.6 $g/cm^3$ or less, or even about 1.55 $g/cm^3$ or less. Tensile strength, compressive strength, and/or density may be measured when the composite structure exhibits resin of about 39 percent to about 41 percent by weight and an outer layer of about 50 percent to 53 percent by volume.

The composite structure may initially be formed as a layered tubular member prior to being cured. The layered tubular member may provide a layered build-up of components of the composite structure prior to curing, provide a flexible member which can be easily formed into the one or more complex shapes and contours of the composite structure prior to curing, or both. The layered tubular member may have one or more flexible and/or elastomeric components so that the layered tubular member can take on a shape within a chamber of a mold. The layered tubular member may have a generally tubular shape. The layered tubular member may be hollow, partially filled, or solid. The layered tubular member may be free of or at least partially filled with one or more internal reinforcement structures. The layered tubular member may be able to resist pressure applied by a vacuum to retain its shape. The layered tubular member may provide a carrier or support structure for a resin prior to being inserted into the mold, may be impregnated with resin within a mold, or both. The layered tubular member may include an outer layer, an inner layer, or both.

The layered tubular member may include one or more outer layers. One or more outer layers may function to cooperate with a resin, one or more other outer layers, and/or inner layer to form a composite structure; provide a carrier for a resin; absorb a resin; conform to a shape of an inner layer; conform to a shape of a hollow chamber, or any combination thereof. An outer layer may have any suitable shape, size, and/or configuration for conforming about an inner layer, a shape of a hollow chamber, a final shape of a composite structure, or a combination thereof. One or more outer layers may include a single outer layer or a plurality of outer layers. A plurality of outer layers may include two or more, three or more, or even four or more outer layers. A plurality of outer layers may include ten or less, eight or less, or even six or less outer layers. A plurality of outer layers may be joined at one or more seams to form a layered tubular member, composite structure, or both. One or more outer layers may be shaped as a sleeve, a portion of a sleeve, a sheet, a mat, the like, or a combination thereof. For example, the outer layer may be shaped as a sleeve to cooperate with a tubular inner layer. As another example, an outer layer may be flexible sheet which takes on the shape of at least part of a tubular inner layer when located thereon. The outer layer may be hollow, partially filled, or solid. The outer layer may be hollow to receive an inner layer therein and/or one or more internal reinforcement structures therein. The outer layer may be rigid, flexible, or both. An outer layer which is rigid (i.e., prior to being formed into a composite structure) may have a hollow interior with a shape reciprocal with the shape of an inner layer, an overall shape similar to the resulting composite structure, or both. An outer layer which is flexible may allow the outer layer to conform to a shape of an inner layer, a hollow chamber of a mold, or both; allow the outer layer to expand (e.g., such as upon expansion of an inner layer); allow a layered tubular member to conform to varying angles and directions in a mold; or any combination thereof. An outer layer which is rigid or semi-rigid may allow the outer layer to already be formed in a shape having similar contours to an inner layer, hollow chamber of a mold, or both; allow the outer layer to be quickly formed into a composite structure; or both. An outer layer may be porous, non-porous, or a combination thereof. An outer layer which is at least partially porous may be referred to as a porous outer layer. An outer layer which is at least partially porous may receive a resin within one or more pores. One or more pores may be formed by spacing between two or more strands of a woven material, openings formed within a woven and/or non-woven material, or a combination thereof. One or more outer layers may include one or more open ends. One or more outer layers may be assembled together to include one or more open ends. The one or more open ends may allow for an inner layer and/or one or more internal reinforcement structures to be inserted into the outer layer, one or more supply lines to be in fluid communication with an interior of the layered tubular member, or a combination thereof. The one or more open ends may include two open ends located at opposing ends of the one or more outer layers. For example, a sleeve-shaped outer layer may include two opposing open ends. As another example, a first outer layer having a C-shape cross-section may be located adjacent to a second outer layer also having a C-shape cross-section thus forming a sleeve-like shape within opposing open ends. The outer layer may comprise one or more exterior materials, one or more interior materials, or both.

The outer layer may include one or more exterior materials. An exterior material may be particularly useful in allowing the outer layer to be impregnated with a resin, provide a carrier for a resin, allowing the outer layer to conform to the shape of an inner layer and/or mold, providing structural reinforcement to a resin and/or composite structure, or any combination thereof. The exterior material may be any material suitable for functioning as recited. One or more exterior materials may be formed of an elastic material, glass, fiber, carbon, or any combination thereof. One or more exterior materials may include a single exterior material or a plurality of exterior materials. One or more exterior materials may include 1 or more, 2 or more, 3 or more, or even 4 or more separate layers of one or more exterior materials. One or more exterior materials may include 15 or less, 13 or less, or even 10 or less separate layers of one or more exterior materials. The one or more exterior materials may include one or more seams or be seamless. A seamless one or more exterior material may be advantageous as the outer layer provides continuous structural reinforcement about an entire periphery of a composite structure while avoiding weak regions (e.g., such as weak regions defined by a seam). A seamed one or more exterior materials may be advantageous in allowing for a low-cost and quick forming process of the composite structure. A seam may be formed at an overlap between one or more exterior materials with one or more other exterior materials. One or more seams may be bonded with an adhesive between two or more exterior materials. Each exterior material may have a thickness. The thickness may be sufficient to cooperate with a resin to provide a composite structure with sufficient strength and stiffness properties. A thickness may be about 0.2 mm or greater, about 0.25 mm or greater, or even about 0.3 mm or greater. A thickness may be about 1.0 mm or less, about 0.9 mm or less, about 0.8 mm or less, about 0.7 mm or less, or even about 0.50 mm or less. Each exterior material may have a fabric weight. The fabric weight may be about 200 gm/m$^2$ or greater, about 250 gm/m$^2$ or greater, about 300 gm/m$^2$ or greater, or even about 350 gm/m$^2$ or greater. The fabric weight may be about 1,500 gm/m$^2$ or less, about 1,250 gm/m$^2$ or less, about 1,000 gm/m$^2$ or less, or even about 800 gm/m$^2$ or less. One or more exterior materials may be porous, non-porous, or both. Pores may be defined as space (e.g., gaps) formed between strands of a woven material, openings formed in a non-woven and/or non-woven material, or a combination thereof. The one or more exterior materials may be a woven and/or nonwoven material. Woven material may include a braided material, unidirectional material, a non-crimped material, other suitable fabrics having interlaced materials, the like, or a combination thereof. Nonwoven material may include bonded materials (e.g., fibers). One or more exterior materials may be formed from fibers. The fibers may be continuous fibers, chopped fibers, or a combination of both. For example, woven material may in the form of continuous fiber sleeves or mats. An exemplary suitable material for a continuous fiber exterior material may include a composite sheet available from DOW®, such as the VORAFUSE™ P sheets. For example, nonwoven material may be in the form of sleeves or mats having chopped or randomly oriented fibers bonded together with a resin, such as a matrix resin. An exemplary suitable material for bonding chopped randomly oriented fibers may include a compound available from DOW®, such as VORAFUSE™ M sheets.

One or more exterior materials may include a braided material. Braided material may impart elastic or flexible properties on the exterior material without requiring an elastomeric material. Braided material may allow for the outer layer to conform to varying geometries (e.g., shapes) dimensions (e.g. width, diameter, etc.), or both of an inner layer, mold, or both. For example, a braided material may allow the outer layer to have a form fit about a narrower portion of an inner layer while stretching to conform to a wider portion of an inner layer. Braided material may be biaxial, triaxial, unidirectional, custom formed, or any combination thereof. A biaxial braid may be formed in a basket weave form, having two sets of yarn strands crossing over and under each other. Generally, in a biaxial braid, the braids may be defined at a+/−45□ orientation but may be at even lower angles. A triaxial braid may include adding a third set of yarn strands to the typical two sets of yarns of a biaxial braid. The third set of yarn strands may weave with first and second set of yarn strands in an axial direction. A unidirectional material may be a material (e.g., sleeving, sheet) having elastic bias. The elastic bias may be formed by elastic stitching, allowing the unidirectional material to conform to varying geometries and dimensions. The braided material may be formed of an elastic material, glass, fiber, carbon, or any combination thereof. Suitable exterior materials may include one or more braid architectures and/or braid forms produced by A&P Technology, such as the Bimax® biaxial braided sleeves and fabrics (e.g., sheets) comprising glass fiber. Exemplary exterior materials may be found at http://www.braider.com/Braid-Basics/Braid-Forms.aspx. One or more exterior materials may or may not be treated (e.g., coated) with a binder. A binder may function as a stabilizer compatible with a resin. The exterior material may be or may not be impregnated with a resin prior to being assembled with an inner layer and/or being inserted into a mold. The one or more exterior materials may have an interior material adjacent thereto.

The outer layer may include one or more interior materials. An interior material may function to provide reinforcement to an exterior material, additional reinforcement to an outer layer, facilitate removal of an inner layer from an outer layer, promote bonding between an inner layer and outer layer, as a carrier for a resin, or any combination thereof. One or more interior materials may include a single interior material or a plurality of interior materials. One or more interior materials may include 1 or more, 2 or more, 3 or more, or even 4 or more separate layers of one or more interior materials. One or more interior materials may include 15 or less, 13 or less, or even 10 or less separate layers of one or more interior materials. The interior material may be a material which allows the outer layer to cooperate with the inner layer, mold, resin, or combination thereof to form a composite structure. The interior material may be a material which allows the outer layer to adhere to an inner layer or have the inner layer removed after curing. The interior material may be located adjacent to one or more exterior materials, between one or more exterior materials and an inner layer, or both. The interior material may be affixed (e.g., adhered) to an interior of one or more outer layers. The interior material may be formed with a shape similar to an exterior material, inner layer, or both. The interior material may be shaped as a sleeve; sheet; having similar contours to at least a portion of one or more exterior materials, an inner layer, and/or a composite structure; or a combination thereof. The interior material may be hollow, partially filled, or solid. A hollow interior material may allow for an inner layer, one or more reinforcement structures, or both to be located therein. A sheet-shaped interior material may allow for the interior material to be located at least partially about an inner layer; located adjacent to at least part of one or more exterior materials; conform with one or more contours of an inner layer, an adjacent exterior material, or both; or any combination thereof. The interior material may include or be formed into a shape having one or more open ends. The one or more open ends may allow for an inner layer to be received within the interior material. The one or more open ends may be aligned (e.g., centered, co-axial) with one or more open ends of one or more exterior materials. One or more open ends may include two open ends at opposing ends of the interior material. The interior material may be porous, non-porous, or both. Porous may be defined as similar to porous of the outer layer or exterior material. The interior material may comprise one or more materials suitable as one or more exterior materials. One or more interior materials may be the same or different as one or more exterior materials. A suitable interior material may include a unidirectional layer. An interior material may be formed as a sleeve, sheet, or both. An exemplary unidirectional sleeve may be produced by A&P Technology, such as Unimax® braided unidirectional sleeve comprising carbon fiber. An exemplary unidirectional sheet may be produced by A&P Technology, such as ZERO® non-woven unidirectional sheet comprising carbon fiber. The interior material may be assembled such that it is between an inner layer and an exterior material in the layered tubular member.

The layered tubular member may include one or more seams. The one or more seams may function to join one or more outer layers to the same or other one or more outer layers. The one or more seams may allow a sheet or mat of one or more outer layers to be formed into a sleeve-like or tubular shape. The one or more seams may be located anywhere along at least a portion of the outer layer suitable for forming a composite structure. The one or more seams may be formed in one, some, or all of the layers of one or more outer layers (e.g., exterior materials, interior materials). The one or more seams may be substantially linear, non-linear, or both. The one or more seams may be formed by one or more outer layers being adhered to the same or other one or more outer layers. A seam may include an abutted seam, an overlapped seam, or a combination of both. An abutted seam may be created at an edge to edge contact of one or more outer layers with the same or other one or more outer layers. For example, a sheet of one or more outer layers having opposing edges may be rolled such that an abutted seam is created where the opposing edges are in abutting contact. As another example, two or more sheets of one or more outer layers, each having opposing edges, are formed in C-channel shapes and placed in abutting contact such that the opposing edges of one sheet are in abutting contact with the opposing edges of another sheet to form two abutting seams. An overlap seam may be created where one or more outer layers overlap the same or other one or more outer layers. An overlap seam may include an outer edge, an inner edge, or both of the one or more outer layers. An outer edge may be an edge of one or more outer layers at an exterior of a layered tubular member, composite structure, or both. An inner edge may be an edge of one or more outer layers at an interior of a layered tubular member, composite structure, or both. For example, a sheet of one or more outer layers having opposing edges may be rolled such that an overlapping seam is created where the opposing edges overlap with outer and inner surfaces of the one or more outer layers. As another example, two or more sheets of one or more outer layers, each having opposing edges, are formed in C-channel shapes and placed in overlapping contact such that one sheet overlaps another sheet at the opposing edges to two overlapping seams. One or more seams may have a width relative to a perimeter length of a layered tubular member, composite structure, or both. A width, a perimeter, or both may be measured at two-dimensional cross-sections of a layered tubular member, composite structure, or both. A width of a seam may be measured as a distance between an outer edge and an inner edge of a seam. The width of the seam relative to a perimeter of a layered tubular member, composite structure, or both may be about 0% or greater, about 2% or greater, or even about 4% or greater. The width of the seam relative to a perimeter of a layered tubular member, composite structure, or both may be about 100% or less, about 70% or less, about 50% or less, or even about 30% or less. For example, a width of the seam relative to a perimeter of a layered tubular member, composite structure, or both may be about 4% or greater to about 30% or less. The width of a seam relative to a perimeter of about 0% may refer to an abutting seam. The width of a seam relative to a perimeter greater than 0% may refer to an overlapping seam. The one or more seams may be bonded with one or more resins. The resin may be located between edges of one or more outer layers, over one or more edges of one or more outer layers, between inner and outer surfaces of outer layers, or any combination thereof along the one or more seams. The one or more seams may have one or more fillets covering one or more edges of the one or more outer layers.

The one or more seams may include one or more fillets. The one or more fillets may function to strengthen or reinforce the bond between two or more outer layers along one or more seams; provide a strength, stiffness, or both comparable with one or more seamless outer layers; provide an improved frequency response as compared to a composite structure having one or more seams without fillets; or any combination thereof. The one or more fillets may be an overflow of a resin, a separate adhesive, or both at one or more seams. Overflow may be referred to as squeeze-out. The one or more fillets may have any shape, cover any surface at a seam, or both to provide a suitable bond at a seam of one or more outer layers. The one or more fillets may be formed between an edge of one or more outer layers and a surface of one or more outer layers. The edge may include an outer edge, inner edge, or both. The surface may include an outwardly facing surface, inwardly facing surface, or both of the one or more outer layers. An inwardly facing surface may be a surface adjacent to and/or facing toward an inner layer. An outwardly facing surface may be opposite an inwardly surface, adjacent to a chamber of a mold, be an exterior surface of the layered tubular member and/or composite structure, or any combination thereof. At one or more seams, the one or more fillets may be located over one or more edges, extend from one or more surfaces toward one or more edges, extend from one or more surfaces over one or more edges, or any combination thereof. Each seam may include an exterior fillet, interior fillet, or both. An exterior fillet may extend from an outwardly facing surface of one or more outer layers over an outer edge of the seam. An interior fillet may extend from an inwardly facing surface of one or more inner layers over an inner edge of the seam. A fillet may have one or more profile shapes. One or more profile shapes may be linear, non-linear, or both. A linear profile shape may be that in a two-dimensional cross-section of a composite structure, the fillet extends in a substantially straight line from an edge of an outer layer to a surface of the outer layer. Non-linear may include concave, convex, wavy, free-formed, the like, or any combination thereof. A non-linear profile shape may be in reference to the profile shape of the fillet in a two-dimensional cross-section of a composite structure. The one or more fillets may be part of or bonded with a resin or other adhesive located between an outer surface and inner surface at a seam. The one or more fillets may be overflow of a resin or other resin located between surfaces at the seam. A force applied to one or more outer layers may result in resin or other adhesive from flowing from between surfaces at a seam to over one or more edges at a seam. For example, the force may be the force applied to the outer layers in the molding process. A resin or other adhesive may be applied along one or more edges along the seam. The resin or other adhesive may then bond with a resin of the composite structure located at the seam. A fillet may have a height, width, or both suitable for reinforcing a seam. The height, width, or both may be measured at a two-dimensional cross-section of a layered tubular member, a composite structure, or both. A height may be measured substantially perpendicular relative to an outwardly facing surface of one or more outer layers. A length may be measured along a length and/or parallel to an outwardly facing surface of one or more outer layers. The height, width, or both may be measured relative to a thickness of one or more outer layers. The height, width, or both may be measured relative to a thickness of one or more outer layers at one or more edges. A fillet may have a height relative to a thickness of one or more outer layers of about 20% or greater, about 50% or greater, or even about 80% or greater. A fillet may have a height relative to a thickness of one or more outer layers of about 200% or less, about 180% or less, about 150% or less, or even about 120% or less. For example, a fillet may have a height relative to one or more outer layers of about 80% or greater to about 120% or less. A fillet may have a length relative to a thickness of one or more outer layers of about 20% or greater, about 30% or greater, about 40% or greater, or even about 50% or greater. A fillet may have a length relative to a thickness of one or more outer layers of about 300% or less, about 275% or less, about 250% or less, or even about 200% or less. For example, a fillet may have length relative to a thickness of one or more outer layers of about 50% or greater to about 200% or less. The layered tubular member may include an inner layer. The inner layer may function as a reinforcement structure for an outer layer, to impart a shape to the outer layer, to resist inward pressure on the layered tubular member within a mold, as a carrier of a resin, or any combination thereof. The inner layer may be or function as a mandrel. The inner layer may be particularly useful in applying pressure to an inside of the outer layer while a vacuum is drawn about the layered tubular member while in a mold. The inner layer may have a shape similar or different from that of the resulting composite structure. The inner layer may be formed in a shape similar to the resulting composite structure prior to or when inserted into the mold. The inner layer may have a shape which is generally cubical, cylindrical, conical, annular, prismed, spherical, the like, or any combination thereof. The inner layer may be hollow, partially filled, or solid. A hollow inner layer may receive one or more internal reinforcement structures therein. A partially filled or solid inner layer may include an internal reinforcement structure therein. The inner layer may be removed from the layered tubular member after curing or remain within the layered tubular member after curing. The inner layer may be part of a composite structure or the composite structure may be free of the inner layer. The inner layer may be free of a resin or carry a resin thereon. The inner layer may carry or be free of a resin thereon prior to being assembled into a layered tubular member or being inserted into the mold. The inner layer may include a bladder member, a resin, one or more films, one or more caps, one or more internal reinforcement structures, one or more tightening members, or a combination thereof. The inner layer may or may not be in fluid communication with a supply line. The inner layer may provide a counter pressure while a layered tubular member is within a mold. A counter pressure may be an ambient pressure prior to a vacuum evacuation about the layered tubular member and/or may be provided by one or more internal reinforcement structures. An outer surface of an inner layer may be adjacent to, in direct contact with, or both to an outer layer. An outer surface of an inner layer may be an outer surface of a bladder member.

The inner layer may include a bladder member. The bladder may function to shape, provide structural support, or both to an outer layer; prevent inward deformation resulting from a vacuum; provide a carrier structure for a resin, or any combination thereof. The bladder member may be hollow, partially filled, completely filled, or solid. For example, a bladder member may be a substantially solid mandrel about which one or more outer layers are located. A mandrel may be made from any suitable material, such as one or more metals. One or more metals may include steel, aluminum, other alloys, or any combination thereof. A solid bladder member may be particularly useful in avoiding the need for additional internal reinforcement structures within the bladder member. The bladder member may generally have a tubular shape. The inner layer may include a hollow interior. The hollow interior may be particularly useful for having one or more internal reinforcement structures located therein. The bladder member may include one or more openings. The one or more openings may provide access into an interior. One or more openings may include two openings located at opposing ends of the bladder member. The bladder member may include one or more lips (i.e., also referred to as beads). The one or more lips may be located about the one or more openings. The one or more or more lips may be about the same or a greater thickness than the remaining material of the bladder member. The one or more lips may be formed by rolling a portion of the bladder member over itself at the one or more ends to form a thicker portion about the one or more openings. The one or more lips may function to engage one or more caps, internal reinforcement structures, supply lines, or a combination thereof. The one or more lips may surround at least a portion of one or more caps, internal reinforcement structures, supply line, or a combination thereof. The bladder member may include a film or be free of a film. The bladder member may be free of a resin prior to bonding with an outer layer, include a resin applied thereon, or may be the resin.

The bladder member may be comprised of any material suitable for providing structural reinforcement to the outer layer within a mold and/or vacuum, when a vacuum is drawn about the layered tubular member, carrying a resin thereon, having one or more internal reinforcement structures located therein, allowing from removal from an outer layer, bonding with an outer layer, or any combination thereof. The bladder member may be comprised of a material suitable for containing one or more internal reinforcement structures therein, having a resin thereon, having a film located thereon, or any combination thereof. The bladder member may be comprised of a rigid material, an elastomeric material, or a combination of both. A rigid material may have a shape similar to a final shape of the composite structure. A rigid material may provide support to an outer layer. A rigid material may be sufficiently strong to reinforce an outer layer when a vacuum is drawn on a mold to impregnate the outer layer with a resin. A rigid material may be able to resist inward deformation at inward pressures ranging from about 5 psi to about 30 psi. An elastomeric material may allow for expansion of the bladder member. Expansion may occur from one or more internal reinforcement structures within the bladder member applying a counter pressure within an interior of the bladder member. The elastomeric material may allow for about 100% elongation or greater, about 200% elongation or greater, about 300% elongation or greater, or even about 350% elongation or greater. The elastomeric material may allow for about 700% elongation or less, about 600% elongation or less, about 500% elongation or less, or even about 450% elongation or less. An elastomeric material may include rubber, silicone, mixtures thereof, laminated structures thereof, or any combination thereof. For example, latex may be a suitable elastomeric material. The bladder member may be formed by any suitable method for forming the elastomeric material, such as dip molding. The elastomeric material may be heat resistant such that the elastomeric material retains its elastomeric properties during at least a portion of the forming process of a composite structure, a resin curing process, or both. The elastomeric material may be heat resistant at a temperature of about 100° F. (37.8° C.) or greater, about 150° F. (65.6° C.) or greater, about 200° F. (93.3° C.) or greater, or even about 225° F. (107.2° C.) or greater. The elastomeric material may be heat resistant at a temperature of about 400° F. (204.4° C.) or less, about 350° F. (176.7° C.) or less, about 300° F. (148.9° C.) or less, or even about 275° F. (135.0° C.) or less. The elastomeric material may be heat resistant when exposed to elevated temperatures for a duration of time. The elastomeric material may be heat resistant when exposed to elevated temperatures for about 10 hours or greater, about 15 hours or greater, about 20 hours or greater, or even about 25 hours or greater. The elastomeric material be heat resistant when exposed to elevated temperatures for about 50 hours or less, about 45 hours or less, about 40 hours or less, or even about 35 hours or less. The bladder member may have a material thickness. A material thickness may be a thickness of a sidewall of the bladder member. The material thickness may be about 0.010 inches (0.254 mm) or greater, about 0.020 inches (0.508 mm) or greater, about 0.025 inches (0.635 mm) or greater, or even about 0.030 (0.762 mm) inches or greater. A material thickness may be about 0.060 inches (1.524 mm) or less, about 0.050 inches (1.27 mm) or less, about 0.045 inches (1.143 mm) or less, or even about 0.040 inches (1.016 mm) or less. The bladder member may comprise a material suitable for temporarily or permanently adhering to the outer layer or being removable from the outer layer. The bladder member may comprise a film.

The inner layer may include a film or be free of a film. A film may function to promote bonding of a resin to the bladder member. A film may impart strength and/or impact resistance to the composite structure after curing. A film may partially or completely surround an outer surface of bladder member. The film may be applied about all or part of an outer surface of the bladder member. The film may an elastomer so the film does not constrain the elastomeric properties of the bladder member. The film may be any suitable film for bonding with a resin prior to curing of the resin, during curing of the resin, or both. The film may allow the inner layer to function as a carrier structure for the resin. The film may allow the inner layer to bond with the resin and the outer layer during curing. The film may be any film which may enable polar interaction and/or covalent bonding between the resin and the film. The film may provide for a durable olefin-based coating on the composite structure. The film may comprise olefin, polyester, thermoplastic polyurethane (TPU), polyamide, polyamine, the like, or any combination thereof. The film may be a grafted amine functional film, grafted polyolefin film, or both. Such polymeric materials may contain grafts on the polymeric structure. Generally grafted structures may include about 0.05 wt % of the graft or greater, about 0.1 wt % of the graft or greater, or even about 0.2 wt % of the graft or greater. Grafted structures may include about 2.0 wt % of the graft or less, about 1.8 wt % of the graft or less, about 1.5 wt % of the graft or less, or even about 1.2 wt % of the graft or less. A suitable graft of a grafted structure may be an amine, such as ethylamine, and/or an acid anhydride, such as maleic anhydride. The film may have a density of about 0.80 gm/cc or greater, about 0.82 gm/cc or greater, or even about 0.85 gm/cc or greater. The film may have a density of about 0.95 gm/cc or less, about 0.93 gm/cc or less, or even about 0.90 gm/cc or less. The film may have a melting point of about 32° C. or greater, about 35° C. or greater, or even about 36° C. or greater. The film may have a melting point of about 110° C. or less, about 105° C. or less, or even about 100° C. or less. The film may have a glass transition temperature of about −70° C. or greater, about −65° C. or greater, about −60° C. or greater, or even about −55° C. or greater. The film may have a glass transition temperature of about −25° C. or less, about −30° C. or less, about −35° C. or less, or even about −40° C. or less. The film may have a crystallinity suitable to allow for flexibility of the film such that the inner layer is able bend, expand, and/or contract with the bladder member. An olefin-based film may have a low crystallinity. Crystallinity of a film may be about 10% or greater, about 12% or greater, about 14% or greater, or even about 16% or greater. Crystallinity of a film may be about 30% or less, about 24% or less, about 20% or greater, or even about 18% or greater. Suitable exemplary films may include ENGAGE™ and AFFINITY™ polyolefin elastomers produced by The Dow Chemical Company.

The inner layer may include one or more internal reinforcement structures. The one or more internal reinforcement structures may function to expand a bladder member, apply an outward pressure to and/or maintain the general shape of the inner layer, layered tubular member, composite structure, or any combination thereof; apply a counter pressure relative to an exterior pressure (e.g., vacuum); resist inward deformation of the inner layer, layered tubular member, composite structure, or any combination thereof resulting from a vacuum; or any combination thereof. The internal reinforcement structure may be any suitable material and/or configuration for expanding the bladder member, applying outward pressure, resisting deformation, and/or maintaining the general shape of the inner layer, layered tubular member, composite structure, or any combination thereof. The one or more internal reinforcement structures may be located within a hollow interior of a bladder member, interior material, exterior material, or any combination thereof. The internal reinforcement structure may include one or more fluids, solids, the like, or any combination thereof. One or more fluids may include a liquid, gas, or a combination of both. The one or more fluids may be heated, pressurized, or both. The one or more fluids may be heated before, during, and or after insertion into the bladder member or may remain at ambient temperatures. Heating of the one or more fluids may result in expansion and/or pressurization of the one or more fluids. A liquid may include a hydraulic fluid, water, a foam prior to expansion, the like, or any combination thereof. A gas may include pressurized gas, such as pressurized air. Pressurized air may include compressed gas. One or more solids may include one or more stiffness members, one or more expandable materials, the like, or a combination thereof. One or more expandable materials may include one or more expandable foams. The one or more internal reinforcement structures may impart an outwardly pressure upon an interior surface of a bladder member, interior material, exterior material, or a combination thereof from within a hollow interior. The outwardly pressure may be sufficient to resist an inwardly pressure (e.g., toward the hollow interior) applied by a mold, vacuum, or both; retain a shape of a layered tubular member; or a combination thereof. The outwardly pressure may be about equal to or greater than and in an opposing direction as an inwardly pressure applied by a vacuum. The outwardly pressure applied by the internal reinforcement structure may be about 5 psi or greater, about 10 psi or greater, about 15 psi or greater, about 25 psi or greater, or even about 30 psi or greater. The outwardly pressure applied by the internal reinforcement structure may be about 500 psi or less, about 400 psi or less, about 300 psi or less, or even about 200 psi or less. For example, the outwardly pressure applied by the internal reinforcement structure may be from about 5 psi to about 30 psi or even from about 200 psi to about 500 psi. The one or more internal reinforcement structures may remain within the completed composite structure or may be removed after curing of the composite structure. For example, compressed air or hydraulic fluid may be released from an interior of the composite structure. For further example, one or more stiffness members and/or expandable foam may remain within an interior of the composite structure. One or more internal reinforcement structures may be supplied via a supply line through one or more caps. One or more reinforcement structures may be held in place by one or more caps, such as one or more stiffness members.

The inner layer may include one or more stiffness members. The one or more stiffness members may function to reinforce the inner layer, assist in maintaining the shape of the inner layer when an external pressure and/or interior pressurizer is applied, assist in retaining one or more caps sealed with the bladder member, or any combination thereof. The one or more stiffness members may include a single or a plurality of stiffness members. The one or more stiffness members may extend along a length of the inner layer and/or the bladder. The one or more stiffness members may extend from one end of the bladder, a cap, or both to the opposing end of the bladder, cap, or both. The one or more stiffness members may have sufficient stiffness to resist deformation while a vacuum is pulled about a layered tubular member. One or more stiffness members may exhibit a stiffness about equal to or greater than a pressure applied by a vacuum to resist deformation due to the vacuum. The one or more stiffness members may have any shape suitable for reinforcing the inner layer. For example, the one or more stiffness members may be shaped as one or more rods. The one or more stiffness members may have a width (e.g., diameter) less than or equal to a diameter of a bladder (e.g. prior to or after expansion). The one or more stiffness members may be affixed to or integral with one or more caps. The one or more stiffness members may be engaged with one or more caps. The one or more stiffness members may be partially received within one or more caps. Opposing ends of a stiffness member may be engaged with opposing caps. The one or more stiffness members may include one or more reciprocal engagement features to engage with one or more engagement features of one or more caps. One or more reciprocal engagement features may include threads, tabs, barbs, or a combination thereof. The one or more reciprocal engagement features may be located at one or more ends of the stiffness member.

The inner layer may include one or more caps. The one or more caps may function to retain one or more internal reinforcement structures within the inner layer, the bladder, or both; seal the bladder from an external pressure; cooperate with one or more tightening members to seal the bladder; cooperate with a mold to provide a seal; or any combination thereof. The one or more caps may have any general shape and/or size suitable for any of the recited functions. The one or more caps may be located at one or more (e.g., both ends) of a bladder member. The one or more caps may include and/or be free of one or more engagement features for engaging with a bladder member, one or more tightening members, one or more stiffness members, a supply line, a portion of a mold, flanges of a mold, or any combination thereof. The one or more engagement features may provide a gas tight seal, provide a means for secure engagement, or both. The one or more engagement features may include one or more grooves, threads, adhesives, the like, or a combination thereof. The one or more engagement features may be located about an exterior of a cap, within an interior of a cap, or both. For example, a groove may be located about an exterior diameter of the cap. For further example, a threaded opening may be located within an interior of the cap. The one or more engagement features may cooperate with a bladder, tightening member, stiffness member, or a combination thereof. One or more grooves may be encircled by an end of a bladder, a tightening member, or both. One or more threads may engage and mate with a tightening member, a stiffness member, or both. The one or more caps may or may not have an inlet. An inlet may allow for fluid communication between a supply line and an interior of the bladder. The inlet may be an opening passing through one or more of the caps. The inlet may engage with the supply line to provide a gas tight seal about the supply line. The inlet may include one or more seals, threads, adhesives, clamps, the like, or a combination thereof to engage with the supply line.

The inner layer may include one or more tightening members. The one or more tightening members may function to affix one or more caps to a bladder member, provide a gas tight seal between one or more caps and a bladder member, retain one or more stiffness members within a bladder member, retain one or more supply lines affixed with a cap and/or bladder member, or any combination thereof. The one or more tightening members may have any size, shape, and/or configuration to cooperate with one or more caps to function as recited. The one or more tightening features may encircle about a portion of a cap, bladder member, stiffness member, supply line, or a combination thereof. For example, the one or more tightening members may encircle about a cap with a portion of the bladder member therebetween to retain the bladder member to the cap. The one or more tightening members may be located at one or more ends of the inner layer, bladder member, or both. The one or more tightening members may be located within and/or outside of a mold when a layered tubular member is retained within a mold. The one or more tightening members may include one or more clamps, ties, adhesives, or a combination thereof. One or more clamps may include one or more hose clamps, band clamps, and/or the like.

The layered tubular member may include or cooperate with a resin. The resin may function to reinforce the outer layer to provide a desired stiffness and/or strength of the composite structure, cooperate with fibers to form a nonwoven material, bond one or more seams, or any combination thereof. The resin may be provided on at least a portion of an inner layer, outer layer, mold, or any combination thereof prior to or after forming part of a layered tubular member, prior to or after forming one or more seams, prior to or after insertion of a layered tubular member within a mold, prior to curing a layered tubular member into a composite structure, or any combination thereof. The resin may be disposed on, impregnated into, and/or come into contact with at least a portion of the outer layer prior to the outer layer receiving an inner layer, after being assembled with an inner layer to form a layered tubular member, upon placement within the mold, or a combination thereof. The resin may be disposed within one or more seams, between one or more outer layers, or both. The resin may include a same resin or different resins. The resin may include a first resin, second resin, adhesive, or any combination thereof. A resin located within a seam (e.g., between surfaces of one or more outer layers) and one or more fillets may be the same or a different resin as impregnated within one or more outer layers. An exterior material, interior material, or both may be impregnated with the resin (e.g., prior the outer layer receiving an inner layer, the outer layer being placed within a mold). The resin may be disposed on, impregnated into, or be part of the inner layer prior to or after the inner layer is assembled with (e.g., inserted into) an outer layer. The resin may disposed on or may be the bladder member. The resin may be disposed about an outer surface of the bladder member. The resin may be applied and/or delivered into the mold. The resin may be applied on a surface of a hollow chamber of the mold. The mold may have a resin applied prior to and/or after insertion of a tubular member therein. An outer layer may have a resin applied at one or more seams between one or more surfaces of one or more outer layers, as one or more fillets, or both. An impregnated resin may be squeezed out to be located within one or more seams, create one or more fillets, or both.

The resin may include a thermoset resin, thermoplastic resin, ceramic resin, or mixtures thereof. A thermosetting resin may be any resin that can impregnate the outer layer and form a cured matrix. Exemplary thermosetting resins include epoxy, phenolic, polyurethane, polyester, vinyl ester, bismaleimide, polyimide resins and the like. A thermoplastic resin may be any resin that can impregnate the outer layer and has a melting point above the use temperatures. Exemplary thermoplastic resins include polyetheretherketone, polyetherimide, polyarylsulfone, polyamideimide, etc. Ceramic resins that can impregnate the outer layer may be used. Exemplary ceramic resins include those that contain one or more of silicon, carbide, alumina, silica or silicon nitride. The resin may be a one-part resin system or a two-part resin system. The resin may be solid, semi-solid, and/or liquid. For example, the resin may be a semi-solid epoxy-based resin applied on an exterior surface of a bladder member. The resin may be provided as a matrix resin. A matrix may be polymeric, ceramic, metallic, carbon, or a combination thereof. For example, the bladder member may be a matrix resin. A solid or semi-solid resin may have a melting point of about 40° C. or greater, about 45° C. or greater, or even about 50° C. or greater. A solid or semi-solid resin may have a melting point of about 110° C. or less, about 105° C. or less, or even about 100° C. or less. The resin may include or be free of a catalyst. The catalyst may be a heat-activated catalyst. The resin may have a curing temperature at ambient temperature or elevated temperatures above ambient. Ambient temperatures may be about 18° C. or greater, about 20° C. or greater, about 21° C. or greater, or even about 30° C. or greater. Ambient temperatures may be about 36° C. or less, 26° C. or less, about 24° C. or less, or even about 23° C. or less. The one or more elevated temperatures may be at or above an ambient temperature. The one or more elevated temperatures may be about 200° C. or less, about 180° C. or less, or even about 160° C. or less. The curing temperature may be about 120° C. or greater, 130° C. or greater, about 140° C. or greater, or even about 150° C. or greater. Exemplary resins may include VORAFUSE™ P6300, VORAFUSE™ P6100, BETAFORCE™, BETAMATE™, epoxy-based resins, or a combination thereof as epoxy intermediates produced by The Dow Chemical Company.

The composite structure of the disclosure may be formed within a mold. The mold may be particularly useful in forming a composite structure, shaping and/or curing a layered tubular member into a composite structure, or both. The mold may include two or more subassembly portions, two or more mold portions, one or more hollow chambers, one or more flanges, one or more openings, or any combination thereof. The mold may include, be disposed within, be in communication with, and/or be connected to one or more vacuum chambers, one or more ports, one or more pumps, one or more supply lines, or any combination thereof. The mold may be configured and/or disposed into one or more positions. Components of the mold may include two or more mold portions, two or more flanges, one or more hollow chambers, one or more vacuums, one or more vacuum chambers, one or more openings, one or more ports, one or more supply lines, one or more pumps, or any combination thereof.

The mold is comprised of two or more mold portions. The two or more mold portions cooperate together to move one or more components of the mold toward one another, mold (i.e., form) a composite structure, shape and/or cure a layered tubular composite structure into a composite structure, or any combination thereof. The two or more mold portions may have any size, shape, and/or configuration to cooperate with one another to perform one or more of these functions. The two or more mold portions may include an upper mold, a lower mold, or both. At least one of the two or more mold portions may move toward at least another of the two or more mold portions to form a composite structure, shape and/or cure a layered tubular composite member, or any combination thereof. At least one of the two or more mold portions may have one or more portions reciprocal to one or more other components of at least one other subassembly portion; the final shape of the composite structure; a general shape of the layered tubular composite member and/or the inner layer; or any combination thereof. Reciprocal may be defined as one component having a shape with contours substantially similar and inverse to the contours of the shape of another component, composite structure, layered tubular member, or any combination thereof. Reciprocal components may cooperate together to form a hollow chamber within the two or more mold portions; form a composite structure which is tubular; retain the general shape of the layered tubular member as it is formed into a composite structure; deform the layered tubular member into the shape of the composite structure; seal the composite structure within a hollow chamber of the mold; impregnate a resin into a layered tubular member; or any combination thereof. Components of the two or more mold portions may include two or more flanges, one or more hollow chambers, or both.

The mold may include a hollow chamber. The hollow chamber may function to receive, retain, shape, and/or apply a resin onto a layered tubular member, composite structure, or any combination thereof. The hollow chamber may have any shape suitable for receiving and/or retaining a layered tubular member, shaping and/or forming a composite structure, impregnating resin into a layered tubular member, or any combination thereof. The hollow chamber may have a shape resembling and/or reciprocal to a shape of the composite structure. The hollow chamber may be formed between two or more subassembly portions, mold portions, or both. The hollow chamber may be formed by one or more portions of one or more subassembly portions, mold portions, or both which is at least partially reciprocal to a shape of the layered tubular member, composite structure, or both. A surface of the hollow chamber may be suitable for having a resin applied thereon prior to curing, facilitating removal of the composite structure after curing, or both. The surface of the hollow chamber may be comprised of one or more materials which facilitate removal of the composite structure after curing. The one or more materials of the surface of the chamber may include one or more metals, such as steel, chromium, or a combination thereof. For example, the surface of the hollow chamber may comprise a chromed steel surface to allow for removal of the composite structure after curing. The hollow chamber may be in fluid communication with a vacuum, vacuum chamber, supply line, or a combination thereof. The hollow chamber may include one or more openings. The one or more openings may be in one or more mold portions, formed by two or more mold portions, or a combination thereof. One or more openings may be located in a mold portion adjacent to or residing within a vacuum chamber. One or more openings may provide for fluid communication between the hollow chamber and a vacuum, vacuum chamber, supply line, or a combination thereof. One or more openings may be formed between opposing flanges.

The mold may include two or more flanges. The two or more flanges may function to seal about a layered tubular member, prevent a vacuum from accessing an interior of a layered tubular member, retain one or more caps in place relative to a layered tubular member, or a combination thereof. The two or more flanges may have any size, shape, and/or configuration to seal about a portion of a layered tubular member. The two or more flanges may have a shape or contour reciprocal to at least a portion of an exterior surface of one or more caps. For example, a flange of an upper mold may have a contour reciprocal with about half an outer perimeter of a cap. The two or more flanges may be integral with or affixed to one or more mold portions. The two or more flanges may be integral with or attached to one or more mold portions. One or more flanges may be located on one or more ends of one or more mold portions. One or more flanges may move toward at least one or more other flanges to seal about at least a portion of a tubular member. Two or more flanges may seal about one or more caps when a mold is disposed in a closed position.

The mold may be configured and/or disposed into one or more positions. The one or more positions may function so that the mold may receive, shape, and/or cure a layered tubular member, form a composite member, allow for removal of a composite member, or any combination thereof. The one or more positions may be any configuration of two or more subassembly portions. The one or more positions may be positions of the two or more subassembly portions, mold portions, or both. The one or more positions may include an open position, a closed position, or both.

The one or more positions may include an open position. The open position may allow for a layered tubular member to be inserted into the mold, between a lower mold and an upper mold, or both. The open position may allow for a layered tubular member to be deformed into a shape of at least part of a hollow chamber. In the open position, one or more portions (e.g., upper mold) may be distanced from one or more other portions (e.g., lower mold) to allow for a layered tubular member, resin, or a combination of both to be located into the mold. In the open position, the distance between two or more portions (e.g., upper mold, lower mold) may be a distance greater than a height (e.g., cross-sectional diameter and/or width) of a layered tubular member. In an open position, a hollow chamber formed by two or more mold portions may be separated. In an open position, a resin may be applied onto one or more interior surfaces which form a hollow chamber in a closed position. In an open position, one or more flanges may be distanced from one or more other flanges at a greater distance than in a closed position. In an open position, distance between two or more flanges may allow for one or more portions of a layered tubular member to be placed therebetween.

The one or more positions may include a closed position. The closed position may function to seal about a layered tubular member, shape a layered tubular member into the shape of a composite structure, allow for a vacuum to be pulled from the hollow chamber, or any combination thereof. In the closed position, one or more portions may be distanced from one or more other portions to allow for sealing about one or more ends, caps, or both of a layered tubular member. In the closed position, a hollow chamber may be formed between two or more mold portions. In the closed position, one or more surfaces of a hollow chamber may come into contact with one or more portions of a layered tubular member. In the closed position, a resin located on an interior surface of a hollow chamber may come into direct contact with an outer layer of a layered tubular member. In a closed position, a resin may be delivered into a hollow chamber. The resin may be delivered via one or more supply lines. In a closed position, one or more flanges may have a bladder member, one or more caps, one or more tightening members, one or more supply lines, or a combination thereof located therebetween. In a closed position, one or more flanges may be in direct contact with a bladder member, one or more caps, one or more tightening members, or a combination thereof. In a closed position, one or more flanges may form a seal about one or more ends and/or caps of a layered tubular member. Sealing about one or more ends may seal off an interior of a layered tubular member from a vacuum resulting from a vacuum chamber.

The mold may be in fluid communication with a vacuum. The vacuum may function to remove air from a hollow chamber of a mold, pull a vacuum about a layered tubular member, impregnate a resin into the layered tubular member, deform a layered tubular member to conform to a shape of a hollow chamber of a mold, or any combination thereof. The vacuum may have any shape, size, and/or configuration which allows a sufficient vacuum to be drawn from the hollow chamber of the mold to result in impregnation of the resin into at least part of the layered tubular member, deform the layered tubular into the desired shape of a resulting composite structure, or both. The vacuum may be particularly advantageous in uniformly and quickly distributing the resin throughout the outer layer, removing air bubbles within the resin, or both. The vacuum may include a vacuum chamber, one or more ports, a pump, or a combination thereof. A vacuum chamber may be located about, adjacent to, and/or integral with one or more mold portions. For example, the mold may reside within the vacuum chamber. The vacuum chamber may be in fluid communication with a hollow chamber of a mold. One or more openings of one or more mold portions may provide for fluid communication between the hollow chamber and the vacuum chamber. The vacuum chamber may be in fluid communication with a pump. The pump functions to draw air from the vacuum chamber. The pump may have a capacity. The capacity may be any capacity appropriate for enabling a short cycle time in forming a composite structure. The pump may have a capacity of about 6.5 CFM or greater, about 8 CFM or greater, or even about 10.5 CFM or greater. The pump may have a capacity of about 90 CFM or less, about 85 CFM or less, or even about 80 CFM or less. The pump may be able to draw a suitable vacuum to apply sufficient pressure about the layered tubular member to evenly impregnate the resin with the outer layer. Pressures within the hollow chamber while or after drawing a vacuum may include an evacuation of about 5 psi or greater, about 10 psi or greater, or even about be 15 psi or greater. Pressures within the hollow chamber while or after drawing a vacuum may include an evacuation of about 30 psi or less, about 25 psi or less, or even about be 20 psi or less. The vacuum may pull the pressure within the hollow chamber to about 0 psi or greater, 0.05 psi or greater, about 0.1 psi or greater, or even about 0.14 psi or greater. The vacuum may pull the pressure within the hollow chamber to about 5 psi or less, about 3 psi or less, about 1 psi or less, about 0.75 psi or less, about 0.5 psi or less, or even about 0.3 psi or less. The vacuum chamber may have one or more ports formed in one or more walls of the chamber. The one or more ports may allow the pump to be connected to the vacuum chamber, such as via one or more air lines.

The mold may be in fluid communication with one or more supply lines. a supply line may supply one or more internal reinforcement structures, one or more fluids, semi-solids, and/or solids into a hollow interior of a bladder member, supply an outwardly pressure within an interior of an outer layer, deliver a resin into a mold, or any combination thereof. The supply line may be any line appropriate for delivering an internal reinforcement structure into the bladder member, being in fluid communication with the bladder member, delivering a resin into the mold, or both. One or more supply lines may be in direct or indirect communication with a source of an internal reinforcement structure, resin, or both. One or more supply lines may be inserted at one or more ends of a bladder member. A supply line may be engaged with one or more caps, stiffness members, tightening members, a mold, or a combination thereof. A supply line may be engaged with a mold to be in fluid communication with a hollow chamber. The supply line may include one or more engagement features. The one or more engagement features may function to secure the supply line, provide a gas tight seal, or both. The engagement features may be reciprocal to, engage with, and/or mate with one or more engagement features of one or more caps, stiffness members, tightening members, the mold, or a combination thereof. The engagement features may include one or more grooves, threads, adhesives, the like, or a combination thereof. The supply line may be rigid or flexible piping or tubing. A rigid supply line may be comprised of one or more metals, plastics, or a combination thereof. One or more metals may include stainless steel, copper, aluminum, black iron, galvanized steel, the like, or a combination thereof. One or more plastics may include polyvinyl chloride (PVC), nylon, polyurethane (PUR), polytetrafluoroethylene (PTFE), the like, or a combination thereof. An exemplary supply line may include a pneumatic air hose. The supply line may be directly connected to a cap of the inner layer. For example, a supply line may be inserted into an inlet of a cap.

The present teachings also relate to a method of forming the composite structure described herein. The method may include: forming a layered tubular member; inserting a layered tubular member into a mold; impregnating at least a portion of the layered tubular member with a resin; applying a resin at one or more seams; creating one or more fillets, curing the resin so that the layered tubular member and the resin form a composite structure; or any combination thereof.

The method of forming a composite structure may include forming an inner layer. The method may be free of forming an inner layer. The inner layer may be a mandrel made of metal. Forming the inner layer may include forming a bladder member; assembling one or more caps, tightening members, and/or internal reinforcement structures, to a bladder member; or any combination thereof. Forming a bladder member may include molding (e.g., dip molding) a bladder member. Forming a bladder member may include or be free of applying a resin on one or more exterior surfaces of the bladder member. Forming a bladder member may include forming a bladder member from a resin, such as a matrix resin. Forming a bladder member may include applying one or more films. The one or more films may be located about at least a portion of an exterior surface of the bladder member.

Forming an inner layer may include assembling one or more caps. Assembling one or more caps may include placing one or more caps adjacent to one or more ends of a bladder member, inserting one or more caps within one or more openings of a bladder member, or both. For example, opposing caps may be located within opposing openings of a bladder member. The one or more caps may be inserted so that at least part of a length of the cap resides within a hollow interior of the bladder member. A lip and/or opening of a bladder member may be stretched to receive one or more caps therein. A lip about one or more openings of a bladder member may be placed about a diameter of a cap. A lip may elastically conform about a diameter of a cap. A lip of the one or more openings may form a tight fit about the diameter. A lip of the one or more openings may be disposed within one or more engagement features (e.g., groove) of a cap.

Forming an inner layer may include assembling one or more tightening members to a bladder member, one or more caps, or both. The one or more tightening members may be located at least partially about a perimeter of a cap, bladder member, or both. The one or more tightening members may be located about a cap with a bladder member therebetween. The one or more tightening members may be loosened prior to being disposed about a cap and/or bladder member. The one or more tightening members may be tightened about a cap and/or bladder. The one or more tightening members may be tightened to affix and/or seal a cap with a bladder member. Tightening may result in a decrease of a width (e.g. diameter) of a tightening member. Tightening may include threading one or more fasteners, pressing one or more tabs, pulling a band, or a combination thereof.

Forming an inner layer may include assembling one or more stiffness members with the bladder member, one or more caps, a tightening member, or any combination thereof. The one or more stiffness members may be located partially or completely within a bladder member. A stiffness member may be inserted into a hollow interior of a bladder member via an opening. A stiffness member may be inserted into a bladder member during a forming process of the bladder member. A bladder member may be formed (e.g., molded) about one or more stiffness members. One or more stiffness members may be engaged or integral with one or more caps. One or more stiffness members may be at least partially disposed within a cap, adhered with a cap, engaged with one or more engagement features of a cap, integral with a cap, or a combination thereof. Engaged may include one or more engagement features of the stiffness member being engaged with one or more engagement features of a cap. A stiffness member may be engaged with one or more caps prior to insertion into a bladder member, after insertion into a bladder member, or both. A stiffness member may be inserted into a bladder member and then be subsequently engaged with two opposing caps. A stiffness member may engage with a cap prior to insertion into a bladder and then engaged with an opposing cap after being inserted into the bladder member.

The method of forming a composite structure may include forming one or more outer layers. An outer layer may be formed by forming one or more exterior materials, interior materials, or both. Forming an outer layer may include forming one or more sleeves, sheets, mats, or combination thereof. An outer layer may be formed weaving two or more sets of yarn strands to form a woven material. Weaving may include braiding two sets of yarn to form a biaxial braid, braiding two sets of yarn to form at triaxial braid, or both. An outer layer may be formed by forming pores within a woven or non-woven fabric. An outer layer may be formed by disposing a binder on the outer layer. A binder may be disposed on the outer layer by dipping, rolling, spraying, the like, or a combination thereof. An outer layer may be formed by placing one or more exterior materials adjacent to one or more interior materials. An outer layer may be formed by layering a plurality of exterior materials. An outer layer may be formed by layering a plurality of interior materials. An outer layer may be formed by layering a single or a plurality of exterior materials with a single or a plurality of interior materials. The outer layer may or may not have a resin applied thereon prior to insertion into a mold. Resin may be applied onto at least a portion of an outer layer. Resin may be applied by dipping, rolling, spraying, laminating, the like, or a combination thereof. Resin may be applied to at least a portion of an exterior material, interior material, or both. An outer layer may be pre-formed into at least a portion of the composite structure. For example, the outer layer may be formed as a tubular shape (e.g., sleeve). As another example, the outer layer may be a sheet formed as part of or all of a tubular shape (e.g., preformed).

The method of forming a composite structure includes forming a layered tubular member. Forming a layered tubular member may include assembling an inner layer with an outer layer. Assembling an inner layer with an outer layer may include forming an outer layer about an inner layer, inserting an inner layer into the outer layer, wrapping an outer layer about an inner layer, locating at least part of an outer layer about an outer surface of an inner layer, or any combination thereof. An outer layer may be form-fitted or loose-fitted about an inner layer. After assembling an inner layer with an outer layer, portions of an inner layer may remain exposed or be concealed by the outer layer. For example, one or more ends of a mandrel, bladder, lips, caps, tightening members, or any combination thereof may remain uncovered by an outer layer. Portions of the inner layer may remain exposed to then engage and/or seal with one or more portions of a mold (e.g., one or more flanges). The layered tubular member may or may not have resin applied thereon prior to insertion into a mold. Resin may be applied onto at least a portion of the outer layer.

The method may include locating a layered tubular member into a mold. Locating a layered tubular member into a mold may include inserting the layered tubular member into the mold, disposing the layered tubular member onto a resin, opening a mold, closing a mold, or any combination thereof. Opening a mold may include moving one or more mold portions away from one or more other mold portions, disposing the mold into an open position, exposing a hollow chamber, or any combination thereof. Inserting a layered tubular member may include placement of the layered tubular member within a portion of a hollow chamber. Inserting a layered tubular member may include contacting one or more portions of an outer surface of a layered tubular member with a resin. Inserting a layered tubular member may include disposing the layered tubular member on a resin. The resin may be located on a surface of the hollow chamber. Inserting a layered tubular member may include closing a mold. Closing a mold may include moving one or more mold portions toward one or more other mold portions, disposing the mold into a closed position, sealing a hollow chamber, or a combination thereof. Closing a mold may include one or more mold portions and/or flanges contacting and sealing with one or more other mold portions and/or flanges. Closing a mold may include two or more mold portions closing and sealing about a layered tubular member. Closing a mold may include two or more flanges closing and sealing about one or more caps, a bladder member, or both.

The method may include deforming a layered tubular member. A layered tubular member may be deformed into a shape reciprocal with at least a portion of a hollow chamber, substantially similar to the shape of a resulting composite structure, or both. The layered tubular member may be at least partially deformed upon placement into a hollow chamber, closing of a mold into a closed position, or both. The layered tubular member may be bent, contracted, or expanded to conform to differing angles, directions, or both of the hollow chamber. Upon placement on a portion of a hollow chamber when a mold is in the open position, at least a portion of the layered tubular member may deform to conform to the shape of the hollow chamber. Upon closing of a mold, the one or more mold portions may apply pressure to an outside surface of the layered tubular member. The pressure may deform the layered tubular member to deform to conform to the shape of the hollow chamber. One or more internal reinforcement structures may deform the layered tubular member. One or more internal reinforcement structures may apply an outwardly pressure from within an interior of a layered tubular member. The outwardly pressure may expand the layered tubular member. Upon expansion, the layered tubular member may deform to fill any void space within the hollow chamber. Upon expansion, the layered tubular member may deform into a shape substantially similar and reciprocal to that of the hollow chamber. Once deformed, a layered tubular member may have one or more contours.

The method may include or be free of filling a layered tubular member with an internal reinforcement structure. Filling may include disposal of an internal reinforcement structure within the layered tubular member before, during, and/or after forming the layered tubular member, insertion of the layered tubular member within a mold, or any combination thereof. Filling may include disposal of an internal reinforcement structure within the layered tubular member before and/or during drawing a vacuum from a vacuum chamber. Filling may include placing one or more supply lines in fluid communication with a layered tubular member. One or more supply lines may be affixed to one or more ends of a layered tubular member, interior material, bladder member, or combination thereof. One or more supply lines may be inserted into one or more openings of a bladder member, one or more caps, or both. One or more supply lines may be engaged with one or more caps. Engagement may include one or more engagement features of a supply line engaging with one or more engagement features of a cap. Filling may include disposing one or more fluids, solids, or both within layered tubular member, inner layer, bladder member, or a combination thereof. Disposing the internal reinforcement structure may include delivering via one or more supply lines. Filling the layered tubular member with an internal reinforcement structure may apply an outwardly pressure within an interior of a layered tubular member. Filling the layered tubular member with an internal reinforcement structure may include adding a liquid or gas until an outwardly pressure is applied. Filling the layered tubular member with an internal reinforcement structure may include activating and/or expanding one expandable foams. The outwardly pressure may be sufficient to prevent inward deformation of one or more portions of a layered tubular member when a vacuum is drawn, fill one or more voids of a hollow chamber with the layered tubular member, or both. The outwardly pressure may or may not cause expansion of the layered tubular member. Expansion may include elastic deformation of a bladder member, one or more interior materials, one or more outer layers, or any combination thereof. Expansion may result in the layered tubular member deforming to a shape substantially similar to and/or reciprocal with a shape of at least a portion of a hollow chamber, the resulting composite structure, or both. Expansion may result in the layered tubular member filling one or more void spaces within the hollow chamber.

The method of forming a composite structure includes applying a resin to one or more portions of one or more outer layers, a layered tubular member, a mold, or a combination thereof. The resin may be applied to an inner layer, outer layer, within one or more seams, a surface of a hollow chamber, or any combination thereof. Application of the resin may include applying a resin, first resin, second resin, or combination thereof. The resin may be applied through spraying, brushing, rolling, dipping, flooding, injection, the like, or any combination thereof. The resin may be at least partially impregnated into one or more surfaces or remain separate from one or more surfaces. The resin may be impregnated into one or more surfaces having porous characteristics. The resin may be partially impregnated into one or more exterior materials, interior materials, inner layers, or any combination thereof. The resin may be applied to the layered tubular member upon assembly of the inner layer with an outer layer. The inner layer may be the resin (e.g., resin matrix) such that contact of the inner layer with the outer layer may result in application of the resin to the outer layer. The resin may be applied to the layered tubular member upon or after placement into a mold. The resin may be applied to the layered tubular member upon contact with a surface of a hollow chamber. The resin may be delivered into the hollow chamber (e.g., injection) after the layered tubular member is inserted into the hollow chamber. The resin may be applied within a seam before or after insertion into a mold. The resin applied at the seam may be a same or different resin as that within one or more outer layers. Application of the resin to the layered tubular member may allow for impregnation of the resin.

The method may include forming one or more fillets at one or more seams. Forming one or more fillets may include applying a resin within one or more seams, over one or more edges of one or more outer layers, squeezing out a resin from one or more outer layers, or any combination thereof. One or more fillets may be formed by squeezing out a second resin from within a seam, applying the second resin separately to one or more outer layers at the seam, or both. A second resin may be a squeeze out of a first resin of one or more outer layers, may be applied separately (e.g., from the first resin) between surfaces of the one or more outer layers, or both. The resin of one or more fillets may be the same or a different resin as the resin within a seam, within one or more outer layers, or both. The resin of one or more fillets may be applied to a layered tubular member, one or more outer layers, or both before, during, and/or after insertion into a mold. The resin of one or more fillets may be applied within a mold. The mold, inner layer, or both may have one or more features for forming a shape of a fillet. For example, a concave fillet may be formed by reciprocal (convex shaped) protrusion of a mold, inner layer, or both. Application of force from a mold, inner layer, or both may mold a shape, such as the profile shape, of one or more fillets. The mold may apply resin for the fillet via extrusion. The mold may apply resin for a fillet via robotic application, one or more nozzles, one or more sprays, or any combination thereof. The mold may apply the resin for the fillet with the profile shape formed during delivery of the resin along the seam.

The method includes impregnating at least part of the layered tubular structure with a resin. Impregnating the layered tubular structure with a resin may take place within a hollow chamber of a mold. Impregnation may occur due to a force applied by one or more surfaces of a mold, one or more internal reinforcement structures, a vacuum drawn from the hollow chamber, or a combination thereof. Impregnation may or may not occur due to the application of heat causing the resin to flow. Impregnation may result from the mold being disposed in a closed position. In a closed position, one or more mold portions may apply an inwardly force onto one or more outer surfaces of the layered tubular structure, a resin, or both. The inwardly force may result in the resin flowing into pores of an outer layer, inner layer, or both. The inwardly force may result in the resin flowing into pores of one or more exterior materials, interior materials, or both. Impregnation may result from an outwardly force being applied within an interior of a layered tubular member. For example, one or more reinforcement structures (e.g., fluid and/or solid) may apply an outwardly pressure. The outwardly pressure may result in the resin flowing into pores of one or more exterior materials. Impregnation may result from a vacuum being drawn from the hollow chamber. The method of forming the composite structure may include inserting and/or enclosing a mold within a vacuum chamber, placing a mold in fluid communication with a vacuum chamber, or both. A vacuum pump may draw air from a vacuum chamber, hollow chamber, or both. Impregnating the resin into at least a portion of a layered tubular member may or may not include heating the layered tubular member, resin, mold, or a combination thereof. The temperature to which the layered tubular member, resin, hollow chamber, or a combination thereof may be heated to may be a temperature which results in flow of the resin, a melt point of the resin, higher than an ambient temperature, below a curing temperature, or any combination thereof. Exemplary methods for impregnation of the resin may include wet compression, transfer molding, pre-impregnation, or any combination thereof. Transfer molding may include resin transfer molding (RTM), high pressure transfer molding, same qualified resin transfer molding, vacuum-assisted transfer molding, or any combination thereof.

The method of forming a composite structure may include curing the resin. Curing the resin may function to bond the resin with at least a portion of the layered tubular member to form the composite structure. Curing may allow the composite structure to permanently or semi-permanently retain its molded shape. Curing may occur within or separate from the mold. The layered tubular member may remain within the mold or be removed prior to curing the resin. If separate from the mold, the layered tubular member having the resin impregnated therein may be immediately sent to a curing process or may be stored for later curing. Forming a composite structure may include curing the resin so that the resulting composite structure has generally tubular shape, one or more contours, or both. Curing the resin may result in the resin bonded with one or more exterior materials, interior materials, inner layers, or a combination thereof to form a composite. The step of curing the resin may include exposing the resin impregnated into the layered tubular member to one or more temperatures suitable for curing. The one or more temperatures may include one or more temperatures to which the resin may be exposed for a short cycle time or less and cure. One or more temperatures may include an ambient temperature, one or more elevated temperatures, or any combination thereof. The step of curing the resin may include letting the layered tubular member with a resin impregnated therein remain at ambient temperatures to cure the resin. Ambient temperatures may be about 18° C. or greater, about 20° C. or greater, or even about 21° C. or greater. Ambient temperatures may be about 26° C. or less, about 24° C. or less, or even about 23° C. or less. The step of curing the resin may include exposing the layered tubular member with the resin impregnated therein to one or more elevated temperatures. The one or more elevated temperatures may be at or above an ambient temperature. The one or more elevated temperatures may be about 200° C. or less, about 180° C. or less, or even about 160° C. or less. The curing temperature may be about 120° C. or greater, 130° C. or greater, about 140° C. or greater, or even about 150° C. or greater. Upon removal from the mold, curing, or both, the composite structure may relax or spring-back. To compensate for relaxation or spring-back of the composite structure, one or more mold portions may be configured, structured, and/or arranged to form a shape slightly beyond the required contour of the formed and cut composite structure.

The method for forming a composite structure may include removal of a composite structure from a mold. Removing the composite structure may include the mold transitioning from a closed position to an open position. Removal of the composite structure may include one or more mold portions and/or flanges moving away from one or more other mold portions and/or flanges. Removal may include returning the mold to an ambient pressure, reversing the vacuum draw, or both. Removal of the composite structure may be completed manually or robotically. Removal of the composite structure may occur immediately after disposing the mold in the open position or may be delayed. Removal of the formed composite structure may be aided by a draft angle as part of one or more mold portions, a hollow chamber, or both. Removal of the formed composite structure may be aided by a draft angle of about 90° or less, about 80° or less, or even about 70° or less. Removal of the formed composite structure may be aided by a draft angle of about 1° or more, about 2° or more, about 3° or more, about 5° or more, or even about 10° or more. The method of forming a composite structure may include removal of at least part of an inner layer from the composite structure. Alternatively, at least part of the inner layer may remain within the composite structure. In the case the inner layer includes or is the resin, the inner layer may be integrated into the outer layer.

The method of forming a composite structure may include one or more finishing processes. One or more finishing processes may include removing scrap and/or imperfections from the composite structure; coating the composite structure; or both. Imperfections may include sharp edges, rough surfaces, bubbles, the like, or a combination thereof. Scrap may include any overflow areas of the resin; exposed and/or excess portions of the inner layer, outer layer, or both; one or more internal reinforcement structures; or a combination thereof. The scrap may be recycled and reused in forming a subsequent composite structure. Removal of exposed and/or excess portions of an inner layer may include removing one or more caps, one or more internal reinforcement structures, tightening members, or a combination thereof. Removal of one or more internal reinforcement structures may include removal of one or more solids, fluids, or both. Removal of one or more solids may include removal of one or more stiffness members, a foam, or both. Removal of fluids may include removal of one or more gasses and/or liquids. Coating a composite structure include applying a finish coating. A finish coating may add a decorative surface finish and/or provide a barrier coat to further protect the composite structure. Protection may include ultraviolet protection. A finish coating may include paint, varnish, the like, or a combination thereof. The coating may be any type of coating suitable to cooperate and adhere to the resin of the composite structure. The coating may comprise latex, alkyd finishes, polyurethane, polyesters, the like, or a combination thereof.

The method of forming the composite structure may include a short cycle time. A short cycle time may allow the layered tubular member to be cured into the composite structure within a time suitable for automated production, mass production, commercialization, the like, or any combination thereof. A short cycle time may be about 15 minutes or less, about 10 minutes or less, about 8 minutes or less, about 6 minutes or less, or even about 5 minutes or less. A short cycle time may be about 0.1 minutes or more, about 0.5 minutes or more, or even about 0.8 minutes or more. For example, a short cycle time may be from about 0.1 minutes or more to about 3 minutes or less.

Illustrative Embodiments

Figure 1B:
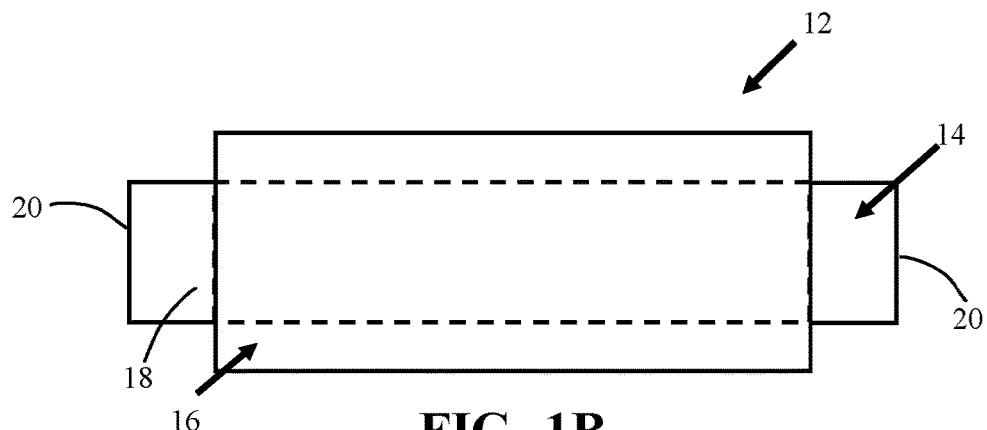
FIG. 1B illustrates a plan view of a layered tubular member.

FIGS. 1A and 1B illustrate a layered tubular member 12. The layered tubular member 12 includes an inner layer 14 and an outer layer 16. The inner layer 14 is inserted into the outer layer 16 so that the outer layer 16 is fitted about at least a portion of an outer surface 18 of the inner layer 14. The inner layer 14 has a cylindrical shape. The outer layer 16 is a porous and flexible material so that it conforms with the geometry of the inner layer 14 (as shown in FIG. 1B). The inner layer 14 includes two opposing ends 20. The two opposing ends 20 are uncovered by the outer layer 16 so that the two opposing ends 20 remain exposed.

Figure 2:
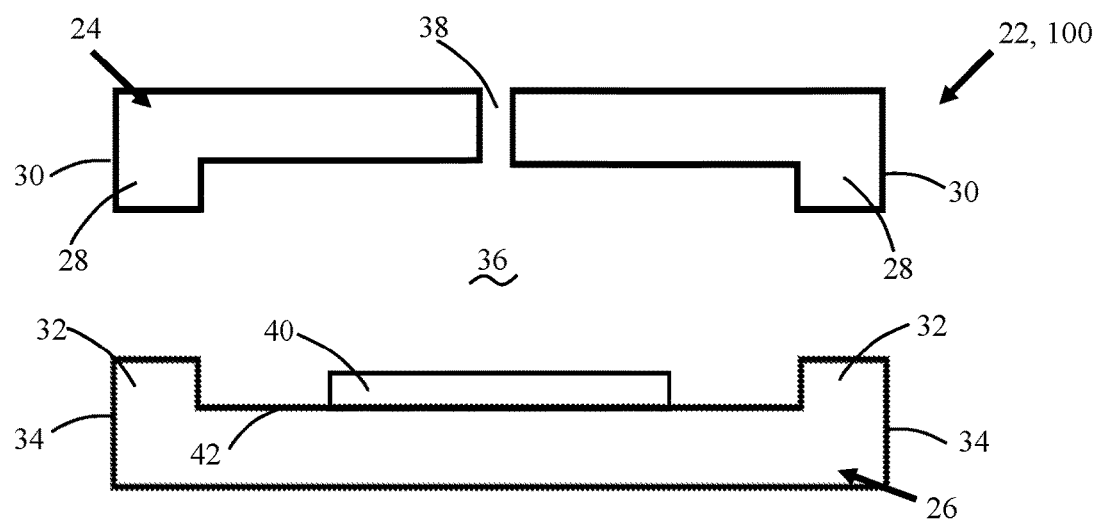
FIG. 2 illustrates a mold in an open position.

FIG. 2 illustrates a mold 22 in an open position 100. The mold 22 is comprised of two portions, an upper mold 24 and a lower mold 26. The upper mold 24 includes upper mold flanges 28 at opposing ends 30. The lower mold 26 includes lower mold flanges 32 at opposing ends 34. Between the upper mold 24 and the lower mold 26, the mold 22 includes a hollow chamber 36. The upper mold 24 includes at least one opening 38. The opening 38 may communicate the hollow chamber 36 with the exterior of the mold 22, such as a vacuum chamber (not shown). In the open position 100, there is sufficient distance between the upper mold 24 and the lower mold 26 to place a layered tubular member 12 (not shown) within the hollow chamber 28. A resin 40 may be disposed onto a surface 42 of the hollow chamber 36 before the layered tubular member 12 is placed within the mold 22.

FIG. 3 illustrates a layered tubular member 12 inserted into the mold 22 in an open position 100. The layered tubular member 12 is placed within the hollow chamber 36 directly on the resin 40. The two opposing ends 20, which are not covered by the outer layer 16, are disposed between the upper mold flanges 28 and lower mold flanges 34.

FIG. 4 illustrates the mold 22 in a closed position 102 and inserted within a vacuum chamber 44. In the closed position 102, the upper mold 24 moves toward the lower mold 26 to encapsulate the layered tubular member 12. Force of the upper mold 24 upon the layered tubular member 12 may result in the resin at least partially impregnating into the outer layer 16. The upper mold flanges 28 and lower mold flanges 32 may come into contact with the two opposing ends 20 which are not covered by the outer layer 16. The contact between the upper mold flanges 28, lower mold flanges 34, and the outer surface 18 at the two opposing ends 20 results in the mold 22 sealing about the layered tubular member 12. At least one opening 38 in the mold 22 provides communication between the hollow chamber 36 and the vacuum chamber 44. The vacuum chamber 44 includes at least one opening 46 so that a vacuum is able to be drawn from the vacuum chamber 44. The at least one opening 46 may be a port in communication with a pump (not shown). By drawing the vacuum, the resin 40 is able be drawn about and fully impregnate the outer layer 16. An air supply line 48 is in communication with the inner tubular member 12. The air supply line 48 provides pressurized air into an interior of the inner layer 14.

FIG. 5 shows a composite structure 10 within a mold 22 and vacuum chamber 44. A resin 40 is impregnated into substantially all of an outer layer 16 of the composite structure 10. After the resin 40 has been impregnated into the outer layer 16, the composite structure 10 may remain within the mold 22 to cure or may be removed from the mold 22 to cure. After or before curing, the inner layer 14 may be removed or may remain within the composite structure 10.

Figure 6:
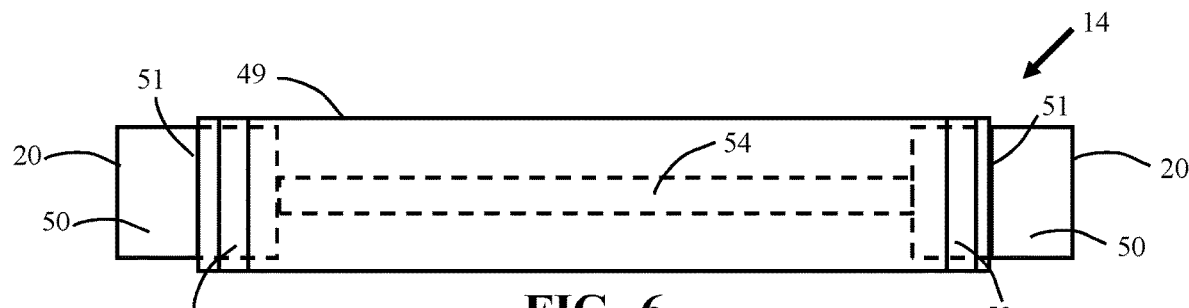
FIG. 6 illustrates a plan view of an inner layer of a layered tubular member.

FIG. 6 illustrates an inner layer 14. The inner layer 14 includes a bladder member 49 which is hollow. The inner layer includes one or more caps 50. The one or more caps 50 are located at each opposing end 20. The one or more caps 50 are inserted into the bladder member 49 at each opposing bladder end 51. A tightening member 52 clamps about the bladder member 49 to retain the cap 50 within the bladder member 49. The inner layer 14 includes a stiffness member 54, such as a rod. The stiffness member 54 extends from one end 51 of the bladder member 49 to the opposing end 51 of the bladder member 49.

Figure 7A:
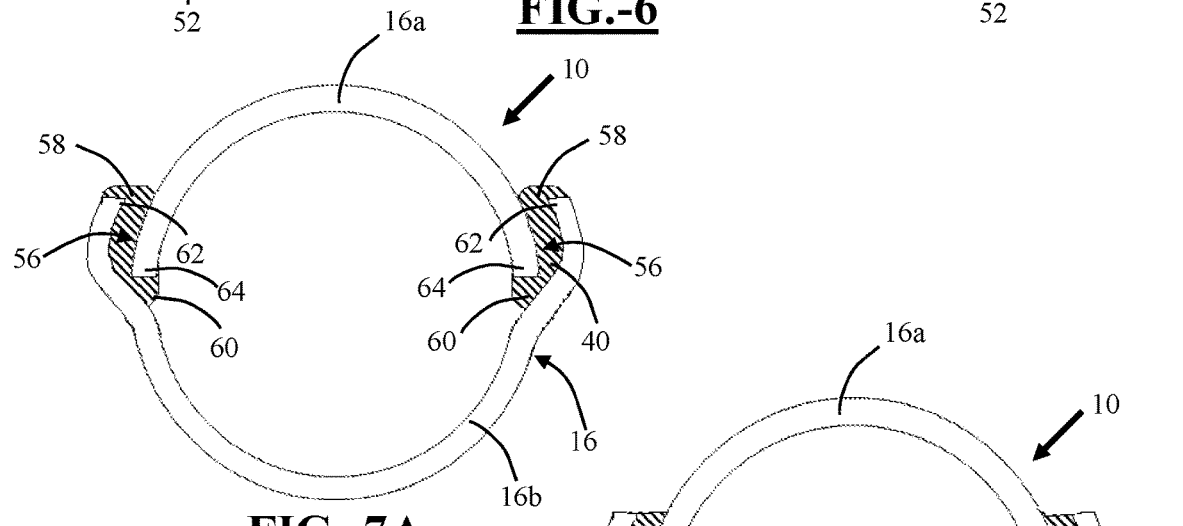
FIG. 7A illustrates a cross-section of a composite structure with opposing seams.
Figure 7B:
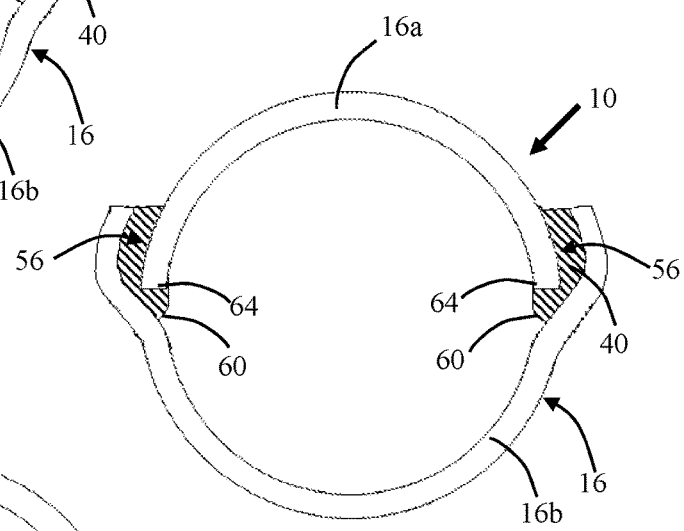
FIG. 7B illustrates a cross-section of a composite structure with opposing seams.
Figure 7C:
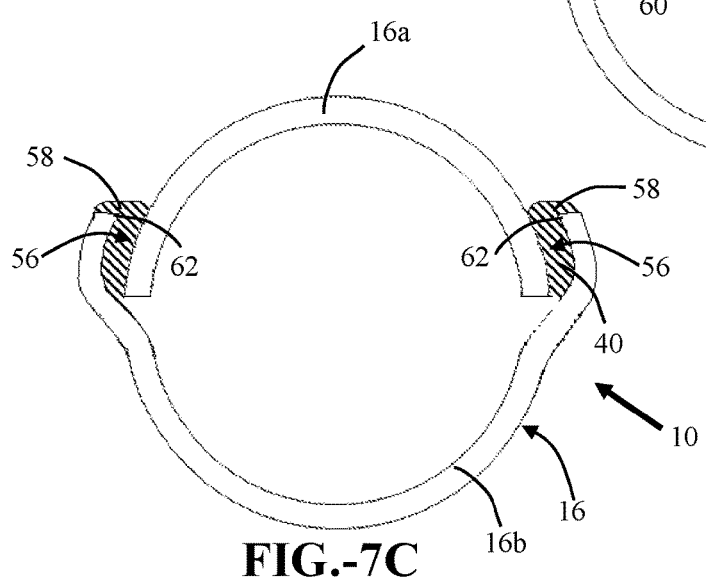
FIG. 7C illustrates a cross-section of a composite structure with opposing seams.

FIGS. 7A-7C illustrate cross-sections of a composite structure 10. The composite structure 10 includes an outer layer 16. The outer layer 16 includes a first outer layer 16a and a second outer layer 16b. The first outer layer 16a and the second outer layer 16b are each about half a perimeter of the outer layer 16. Opposing seams 56 are formed between the first outer layer 16a and the second outer layer 16b. The seams 56 are overlapping seams as the second outer layer 16b overlaps the first outer layer 16a. The first outer layer 16a and second outer layer 16 are bonded at the seams 56 by a resin 40. FIG. 7A illustrates both exterior fillets 58 and interior fillets 60 at the seams 56. FIG. 7B illustrates interior fillets 60 at the seams 56. FIG. 7C illustrates exterior fillets 58 at the seams 56. The exterior fillets 58 are formed by the resin 40 flowing from between the first outer layer 16a and the second outer layer 16b over an outer edge 62 of the second outer layer 16b. The interior fillets 60 are formed by the resin 40 flowing from between the first outer layer 16a and the second outer layer 16b over an inner edge 64 of the first outer layer 16a.

FIG. 8 illustrates an outer layer 16 before being inserted into a mold 22 (not shown) or forming a composite structure 10 (not shown). The outer layer 16 includes a first outer layer 16a and a second outer layer 16b. The first outer layer 16a and second outer layer 16b are each pre-formed into a shape similar to a half of the composite structure 10.

FIGS. 9A-9B illustrate a layered tubular member 12 within a mold 22. The layered tubular member 12 includes an inner layer 14 and outer layer 16. The inner layer 14 is located within the outer layer 16. The inner layer 14 is located between the first outer layer 16a and the second outer layer 16b. In FIG. 9A, the outer layer 16 is impregnated with resin 40 (not shown). In FIG. 9B, a resin 40 is applied between the first outer layer 16a and the second outer layer 16b in the seams 56. The mold 22 in the closed position 102 applies force F on the outer layer 16 toward the inner layer 14. The force F may result in the resin 40 overflowing to form an exterior fillet 58, interior fillet 60, or both as illustrated in FIGS. 7A-7C.

Figure 10A:
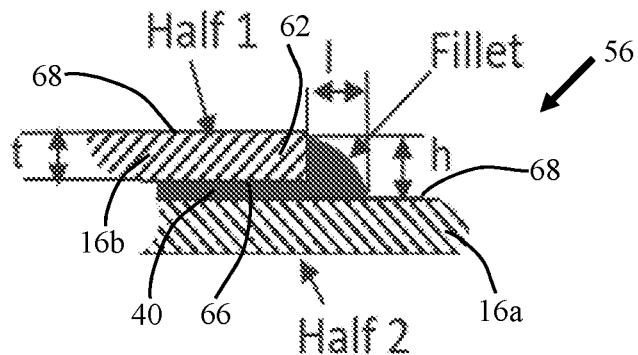
FIG. 10A illustrates a cross-section of a seam with a fillet.
Figure 10B:
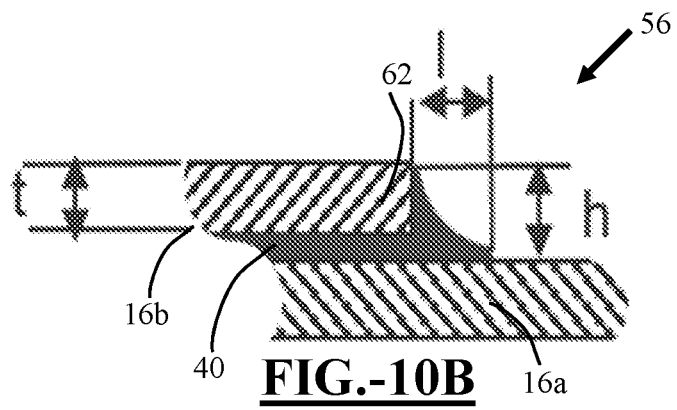
FIG. 10B illustrates a cross-section of a seam with a fillet.
Figure 10C:
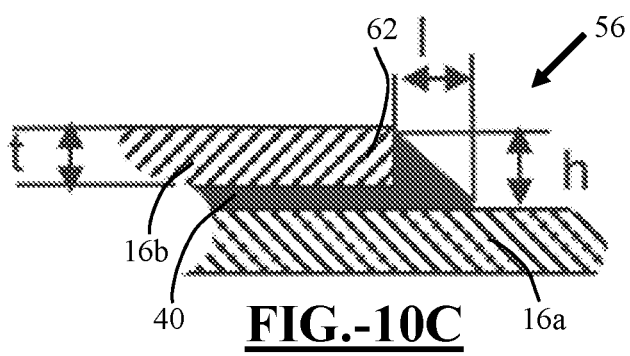
FIG. 10C illustrates a cross-section of a seam with a fillet.

FIGS. 10A-10C illustrate resin 40 in a seam 56 formed by the first outer layer 16a and the second outer layer 16b. The resin 40 is located over an outer edge 62 of the second outer layer 16b and forms an exterior fillet 58. The outer layer 16b has a thickness t measured as a distance between an inwardly facing surface 66 and an outwardly facing surface 68 proximate the outer edge. The resin 40 includes a height h, measured as a distance between an outwardly facing surface 68 of the first outer layer 16a and a furthest outermost portion of the resin 40 relative to the outwardly facing surface 68 of the first outer layer 16a. The resin includes a length l, measured as a distance between the exterior edge 62 of the second outer layer 16b and an outermost portion of the resin 40 relative to the exterior edge 62. FIG. 10A illustrates an exterior fillet 58 having a convex profile. FIG. 10B illustrates an exterior fillet 58 having a concave profile. FIG. 10C illustrates an exterior fillet 58 having a linear profile.

EXAMPLES

The following examples are provided to illustrate the teachings herein, but are not intended to limit the scope thereof.

Example 1

An outer layer is prepared by forming a sleeve including a combination an exterior material with interior materials. For the interior materials, 4 layers of interior material are used to form a sleeve. The 4 layers of the interior material are A&P Unimax™ braided unidirectional sleeves comprised of carbon fiber. Each layer of the interior material has a fiber area weight of 549 g/m$^2$ with a thickness of 0.31 mm. For the exterior material, 1 layer of exterior material is used which encircles about the outside of the interior materials to form an outer layer with a sleeve-shape. The layer of the exterior material is A&P Technology's Bimax™ braided biaxial sleeve comprised of glass fiber.

An inner layer is formed using a hollow rubber tube to form a bladder member. Inserted into the bladder member is a rod. The rod is held in place by two steel caps located at opposing ends of the bladder member. Two clamps retain the caps to the bladder member. The inner layer is inserted into the outer layer to form a layered tubular member.

A resin is applied to the outer layer by hand. The resin is also applied to a surface of a hollow chamber of the mold. The resin is VORAFUSE™ P6300 epoxy resin produced by The Dow Chemical Company. The surface of the hollow chamber is a chromed steel surface.

The layered tubular member having the resin thereon is placed into the hollow chamber of the mold and the mold is closed. The mold is inserted into a vacuum bag. The bag is evacuated to about 0.145 psi to about 0.29 psi for about 1 to 5 minutes to allow the resin to fully impregnate into the outer layer and cure. Heat is applied within the chamber to cure the resin. The layered tubular member remains within the hollow chamber for about 1-5 minutes at a temperature of about 150° C. until the resin is cured to form the composite structure. After curing, the vacuum chamber returns to normal ambient pressure and temperature, and the mold is opened to remove the composite structure.

Example 2

Four outer layers are formed by forming two separate sleeves using sheets of exterior material. A pair of outer layers is formed simultaneously. One pair of outer layers is formed with a larger diameter than another pair of outer layers. For the exterior material of each sleeve, 12 layers (e.g., plies) of the exterior material are used to form each sleeve. The 12 layers of exterior material are each a prepreg sheet of a unidirectional continuous carbon-fiber epoxy composite in which the resin is VORAFUSE™ P6300 by DOW® epoxy resin. The fiber content for the outer layers is from about 60.3+/−0.08 wt % to about 64.5+/−0.4 wt %. The void content for the outer layers is from about 2.06+/−0.09% to about 2.30+/−0.12%. For each sleeve, the first layer is wrapped around an inner layer, then each subsequent layer is wrapped around the previously applied exterior material and inner layer. The inner layer is an aluminum metal mandrel. For the larger diameter sleeve, the mandrel has an exterior diameter of 47 mm. For the smaller diameter sleeve, the mandrel has an exterior diameter of 41 mm. The outer layer wrapped about the inner layer forms a layered tubular member, such that two layered tubular members are formed.

The layered tubular members then have a clear, plastic shrink tape wrapped around to apply pressure onto the outer layers and inner layer. The shrink tape simulates pressure applied by interior walls of a mold chamber.

The layered tubular members are both placed in an oven to cure. Both layered tubular members are both placed in an oven set at a temperature of 150° C. for 2 hours to form two cured pre-molded layered tubular members.

After curing, the two pre-molded layered tubular members are demolded by removing the inner layer from the outer layer. The pre-molded layered tubular members are then trimmed to each have a length of 10 inches (254 mm). After removal of the inner layer, the larger pre-molded tubular members have an outer diameter of 52.1 mm while the smaller pre-molded tubular members have an outer diameter of 46.3 mm. Each pre-molded tubular member has a wall thickness of 2.46 mm.

Each pre-molded tubular member is then cut in half length-wise, such that each pre-molded tubular member forms two C-channel shaped tubular members. Each smaller diameter C-channel is then located within each larger diameter C-channel to form two separate layered tubular members, each having opposing and overlapping seams along their respective lengths. The seams overlap such that they each have a seam width of 12.7 mm.

Comparative Example Using Example 2

Using the layered tubular members of Example 2, the seams are bonded such that one layered tubular member does not include fillets and the other layered tubular member does include fillets. The resin used to adhere two sets of the layered tubular members at the seams is BETAMATE™ 73326/73327 by DOW®, while another two sets of the layered tubular members are bonded at the seams with BETAMATE™ 2090 by DOW®.

In the first layered tubular member, the resin is applied within the seam between an outwardly and inwardly facing surface of the outer layer, but is not applied at either of the exterior or inner edges at the seam to form a fillet. In the second layered tubular, the resin is applied not only within the seam, but also overflows from within the seam to cover the inner edges of both opposing seams. The overflow at the inner edge is referred to as an interior fillet. The resin at the seams is allowed to cure such that the layered tubular members having seams are formed into two separate composite structures. The layered tubular members with BETAMATE™ 73326/73327 are cured for about 30 minutes at about 120° C., while the layered tubular members with BETAMATE™ 2090 are cured for about 120 minutes at 60° C.

Figure 11A:
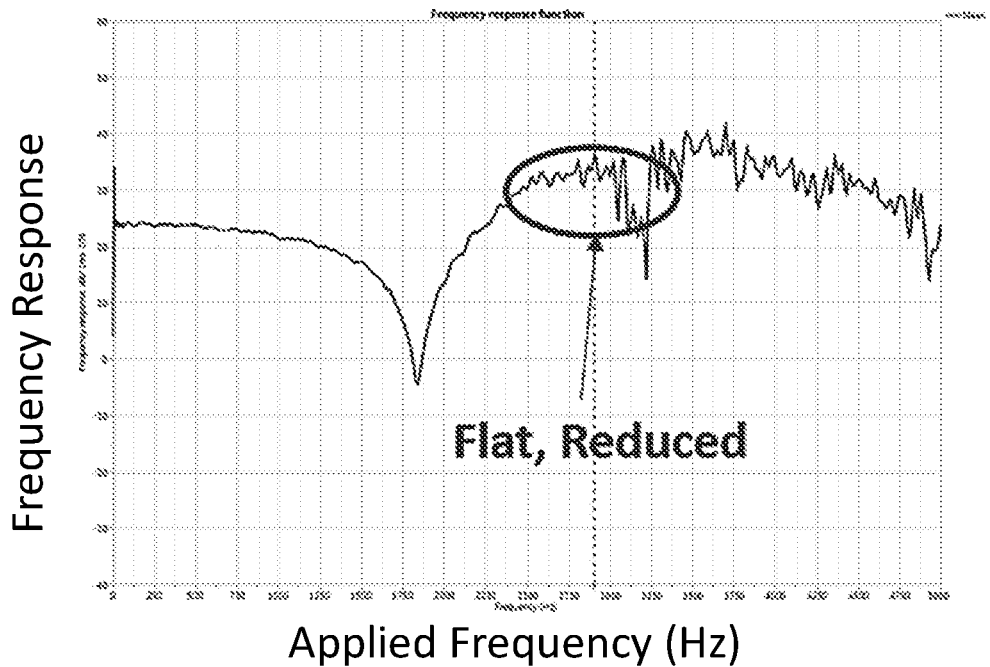
FIG. 11A is a graph representation of a frequency response function.
Figure 11B:
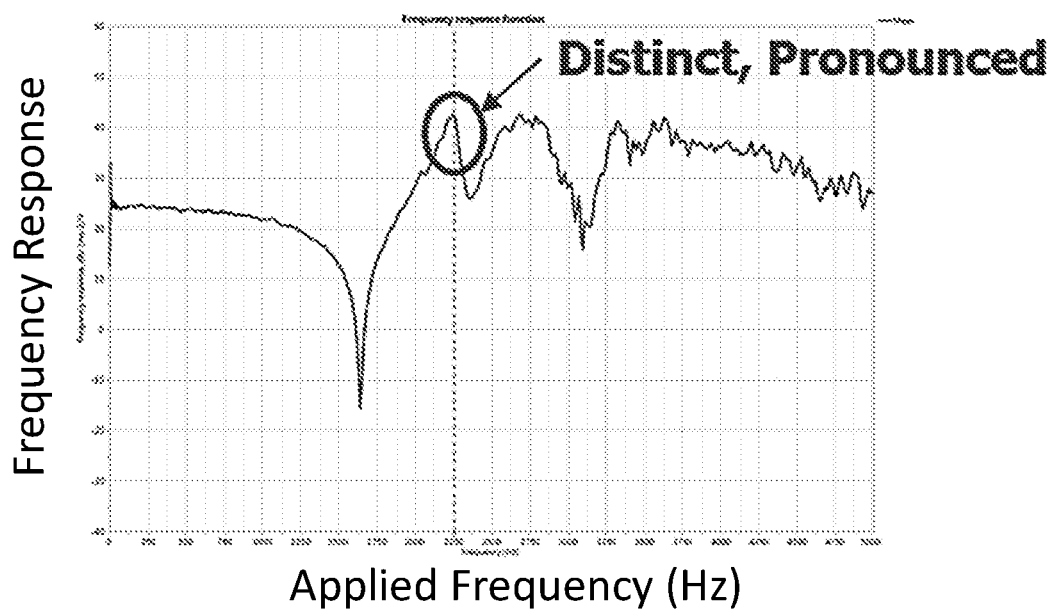
FIG. 11B is a graph representation of a frequency response function.

After curing, both the seamed composite structure with fillets and the seamed composite structure without fillets are tested for natural frequencies. The natural frequencies are compared to a finite element analysis of the composite structure with seams and without fillets. To test the frequency, a method according to the Impact Hammer Modal testing method is used. The Impact Hammer Modal testing procedure can be found in p. 22-24 of The Fundamentals of Modal Testing, Application Note 243-3 by Agilent Technologies (http://www.modalshop.com/techlibrary/Fundamentals%20of%20Modal%20Testing.pdf). An increasing frequency is applied to the composite structures until the composite structure reacts with a first peak in a frequency response. As illustrated in FIG. 11A, the composite structure having interior fillets responds with a first peak at a frequency of 2907 Hz. As illustrated in FIG. 11B, the composite structure with bonded seams without fillets has a first peak at a lower frequency of 2254 Hz. The frequency response of the composite structure without the fillets at the first peak is also more pronounced and distinct compared to the frequency response before and after the first peak. Compared to the finite element analysis, the frequency response of the composite structure with the fillets is 19% higher than the predicted response while the frequency response of the composite structure with the fillets is 9% lower than the predicted response.

Figure 12A:
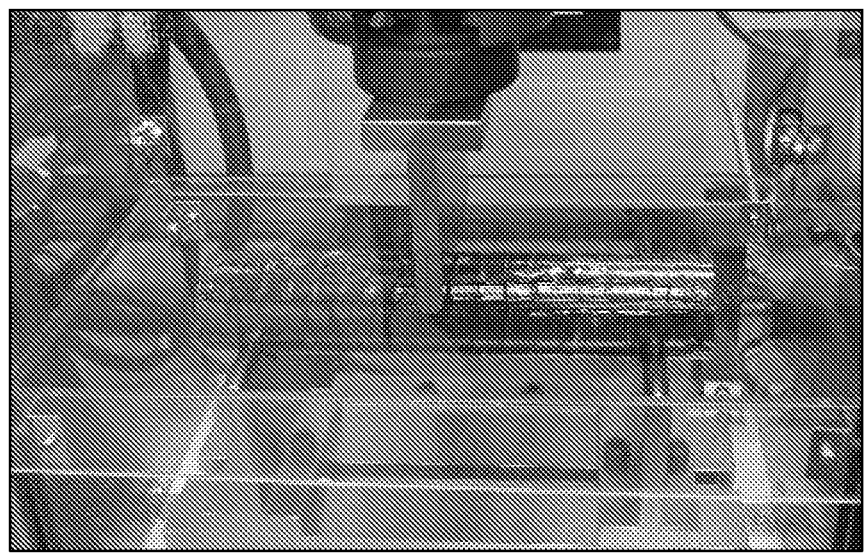
FIG. 12A illustrates a 3-point bending test set-up of a composite structure.
Figure 12B:
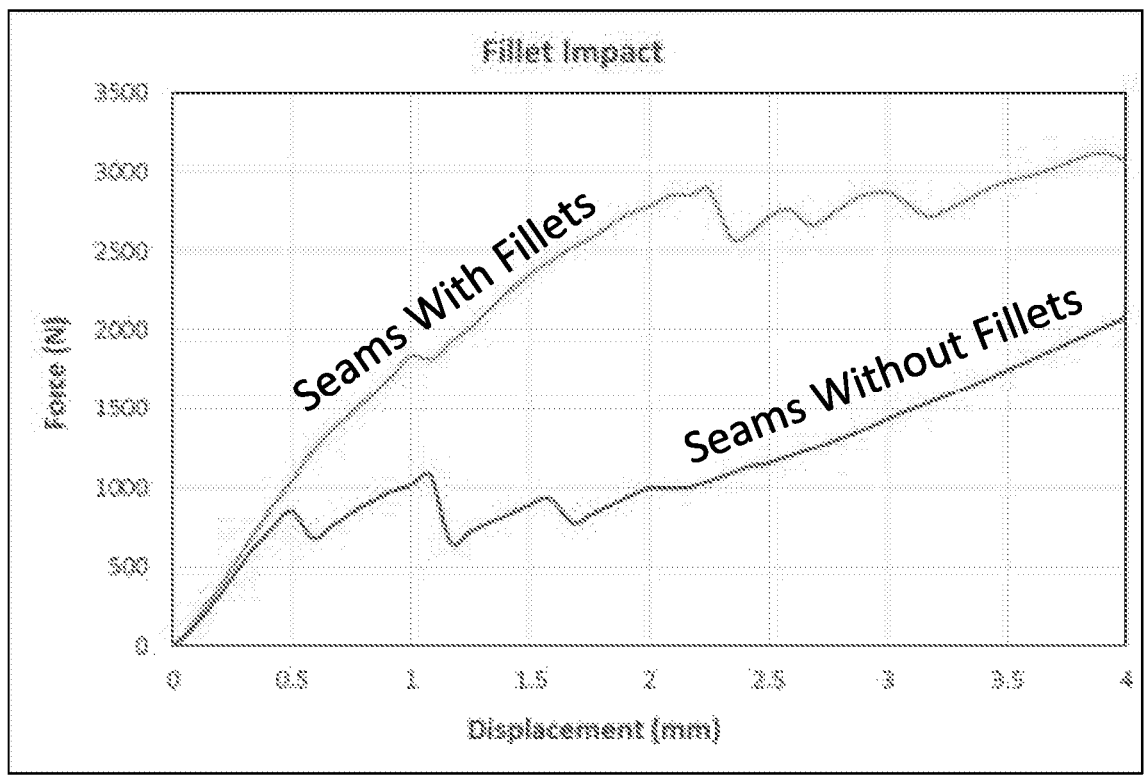
FIG. 12B illustrates load displacement of composite structures.

After the frequency response testing, both seamed composite structures are tested for stiffness. To test the frequency, a 3-point bending test is utilized according to ASTM D790 and as illustrated in FIG. 12A. For the 3-point bending test, V-shaped support fixtures are utilized having an 8-inch span between the centerlines of the two support fixtures, and the composite structures each have a 10-inch length. FIG. 12B illustrates the load-displacement curves occurring from the 3-point bending test. As can be seen, a much higher force is able to be applied to the composite structure with interior fillets to achieve the same displacement as the composite structure without the fillets. The load-displacement curves of FIG. 12B illustrate the composite structure having seams with fillets has a much higher stiffness and strength compared to the composite structure with seams without fillets.

The invention claimed is:

1. A method comprising:
    a) forming a layered tubular member by placing one or more outer layers about an inner layer and joining at one or more seams along a length of the layered tubular member, wherein the one or more outer layers include a first resin impregnated therein;
    b) applying the first resin or a second resin at the one or more seams;

c) creating one or more fillets along the one or more seams with the first resin, the second resin, or an adhesive; and d) curing the first resin, the second resin, and the adhesive so that the layered tubular member, the first resin, the second resin, and the adhesive form a composite structure having a tubular shape.

2. The method of claim 1, wherein the one or more fillets is formed by squeezing out of the second resin from within the seam, by applying the second resin separately to one or to one or more outer layers at the seam, or both.

3. The method of claim 1, wherein the second resin within the one or more seams is squeeze out of the first resin of the one or more outer layers, is applied separate between surfaces of the one or more outer layers, or both.

4. The method of claim 1, wherein to create the one or more fillets, the adhesive is applied to one or more edges of one or more outer layers at the seam.

5. The method of claim 1, wherein the one or more fillets are formed with one or more profile shapes,
wherein the one or more profile shapes are convex, concave, linear, freeform, or a combination thereof.

6. The method of claim 1, wherein the method includes locating the layered tubular member within a mold, forming the layered tubular member within a mold, or both.

7. The method of claim 1, wherein the second resin is applied to the one or more seams outside of a mold, within a mold, or both.

8. The method of claim 1, wherein the second resin is extruded within the one or more seams.

9. The method of claim 1, wherein one or more profile shapes of the one or more fillets are formed within a mold, outside of a mold, or both.

10. The method of claim 1, wherein the first resin, second resin, and the adhesive are cured simultaneously, separately, or any combination thereof.

11. The method of claim 1, wherein the one or more outer layers include one or more woven materials, nonwoven materials, or a combination thereof.

12. The method of claim 11, wherein the one or more woven materials include a braided material, unidirectional material, non-crimped material, other interlaced materials, the like, or a combination thereof.

13. The method of claim 12, wherein the nonwoven materials include bonded materials having randomly oriented fibers.

14. The method of claim 1, wherein the inner layer includes a mandrel, a bladder, or both.

15. The method of claim 1, wherein the method includes removing the inner layer from the one or more outer layers after curing of the first resin, the second resin, the adhesive, or a combination thereof.

16. The method of claim 1, wherein the method includes inserting the layered tubular member into a mold enclosed by a vacuum chamber; and
wherein the first resin is impregnated into the outer layer by having the vacuum chamber pull a vacuum on the mold.

17. The method of claim 1, wherein the first resin, the second resin, the adhesive, or a combination thereof is a thermoset resin system.

18. The method of claim 1, wherein the first resin, the second resin, the adhesive, or a combination thereof comprise one or more epoxy resin systems.

19. The method of claim 1, wherein curing the resin, first resin, second resin, or any combination thereof is at a temperature of about 18° C. or greater to about 200° C. or less.

20. The method of claim 1, wherein a cycle time for curing the layered tubular into the composite structure is 0.1 minutes or greater to about 3 minutes or less.

* * * * *